(12) United States Patent
Batchelder et al.

(10) Patent No.: US 10,744,753 B2
(45) Date of Patent: Aug. 18, 2020

(54) PRINT ASSEMBLY FOR ADDITIVE MANUFACTURING SYSTEM, AND METHODS OF USE THEREOF

(71) Applicant: Stratasys, Inc., Eden Prairie, MN (US)

(72) Inventors: J. Samuel Batchelder, Somers, NY (US); William J. Swanson, St. Paul, MN (US)

(73) Assignee: STRATASYS, INC., Eden Prairie, MN (US)

( * ) Notice: Subject to any disclaimer, the term of this patent is extended or adjusted under 35 U.S.C. 154(b) by 555 days.

(21) Appl. No.: 15/514,740

(22) PCT Filed: Sep. 28, 2015

(86) PCT No.: PCT/US2015/052681
§ 371 (c)(1),
(2) Date: Mar. 27, 2017

(87) PCT Pub. No.: WO2016/049640
PCT Pub. Date: Mar. 31, 2016

(65) Prior Publication Data
US 2017/0239884 A1    Aug. 24, 2017

Related U.S. Application Data

(60) Provisional application No. 62/056,200, filed on Sep. 26, 2014, provisional application No. 62/056,186, filed on Sep. 26, 2014.

(51) Int. Cl.
*B33Y 50/02* (2015.01)
*B33Y 30/00* (2015.01)
(Continued)

(52) U.S. Cl.
CPC ............ *B33Y 50/02* (2014.12); *B29C 64/106* (2017.08); *B29C 64/20* (2017.08); *B29C 64/386* (2017.08);
(Continued)

(58) Field of Classification Search
CPC ......... B33Y 50/02; B33Y 10/00; B33Y 30/00; B33Y 40/00; B29C 64/386; B29C 64/20;
(Continued)

(56) References Cited

U.S. PATENT DOCUMENTS 5,121,329 A    6/1992    Crump
6,722,872 B1   4/2004    Swanson et al.
(Continued)

FOREIGN PATENT DOCUMENTS

DE    4422146 A1    1/1996
WO    9748557 A2    12/1997
(Continued)

OTHER PUBLICATIONS

International Search Report and Written Opinion dated Feb. 29, 2016, for corresponding International Application No. PCT/US2015/052681, filed Sep. 28, 2015.

*Primary Examiner* — Stella K Yi
(74) *Attorney, Agent, or Firm* — Westman, Champlin & Koehler, P.A.

(57) ABSTRACT

A print assembly for use in an additive manufacturing system to print three-dimensional parts, which includes a coarse positioner, a fine positioner, and a liquefier assembly, where a portion of the liquefier assembly is operably mounted to the fine positioner such that the fine positioner is configured to move the portion of the liquefier assembly relative to the coarse positioner.

20 Claims, 16 Drawing Sheets

(51) Int. Cl.
  *B29C 64/20* (2017.01)
  *B29C 64/386* (2017.01)
  *B33Y 40/00* (2020.01)
  *B29C 64/106* (2017.01)
  *B33Y 10/00* (2015.01)
  *B29K 105/00* (2006.01)

(52) U.S. Cl.
  CPC .............. *B33Y 10/00* (2014.12); *B33Y 30/00* (2014.12); *B33Y 40/00* (2014.12); *B29K 2105/0067* (2013.01)

(58) Field of Classification Search
  CPC ............ B29C 64/106; B29C 2037/906; B29C 48/0023; B29C 49/52; B29C 64/00
  See application file for complete search history.

(56) References Cited

U.S. PATENT DOCUMENTS

| | | | |
|---|---|---|---|
| 7,127,309 B2 | 10/2006 | Dunn et al. |
| 7,374,712 B2 | 5/2008 | Swanson et al. |
| 7,384,255 B2 | 6/2008 | LaBossiere et al. |
| 7,604,470 B2 | 10/2009 | LaBossiere et al. |
| 7,891,964 B2 | 2/2011 | Skubic et al. |
| 7,896,209 B2 | 3/2011 | Batchelder et al. |
| 7,897,074 B2 | 3/2011 | Batchelder et al. |
| 7,938,356 B2 | 5/2011 | Taatjes et al. |
| 8,221,669 B2 | 7/2012 | Batchelder et al. |
| 8,236,227 B2 | 8/2012 | Batchelder et al. |
| 8,403,658 B2 | 3/2013 | Swanson |
| 8,439,665 B2 | 5/2013 | Batchelder et al. |
| 8,647,102 B2 | 2/2014 | Swanson et al. |
| 2013/0078073 A1 | 3/2013 | Comb et al. |
| 2013/0161432 A1 | 6/2013 | Mannella et al. |
| 2013/0161442 A1 | 6/2013 | Mannella et al. |
| 2013/0333798 A1 | 12/2013 | Bosveld et al. |
| 2014/0048969 A1 | 2/2014 | Swanson et al. |
| 2014/0158802 A1 | 6/2014 | Batchelder et al. |
| 2014/0159273 A1 | 6/2014 | Koop et al. |
| 2015/0097053 A1 | 4/2015 | Batchelder et al. |

FOREIGN PATENT DOCUMENTS

| | | |
|---|---|---|
| WO | 2012088253 A1 | 6/2012 |
| WO | 2014127426 A1 | 8/2014 |

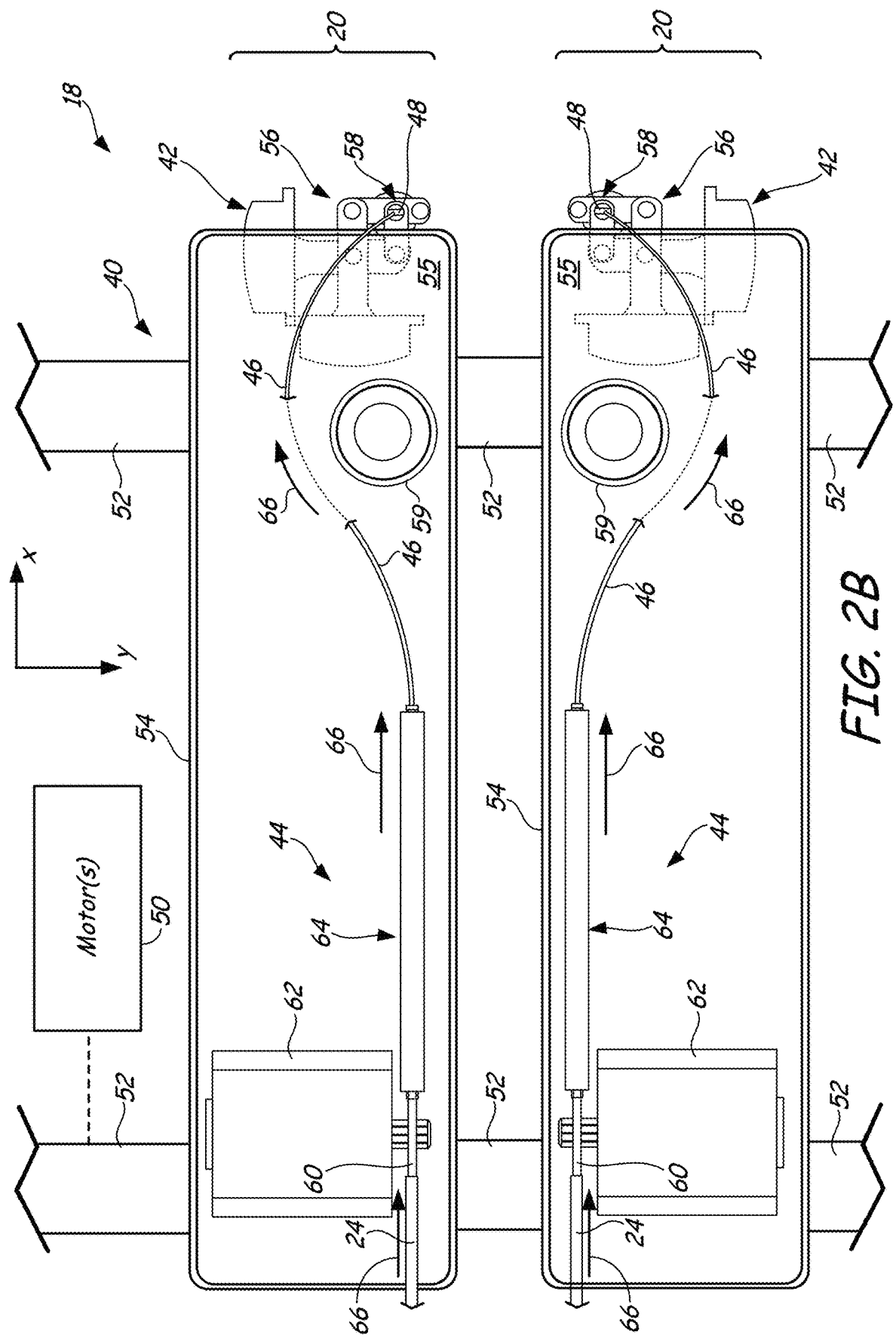

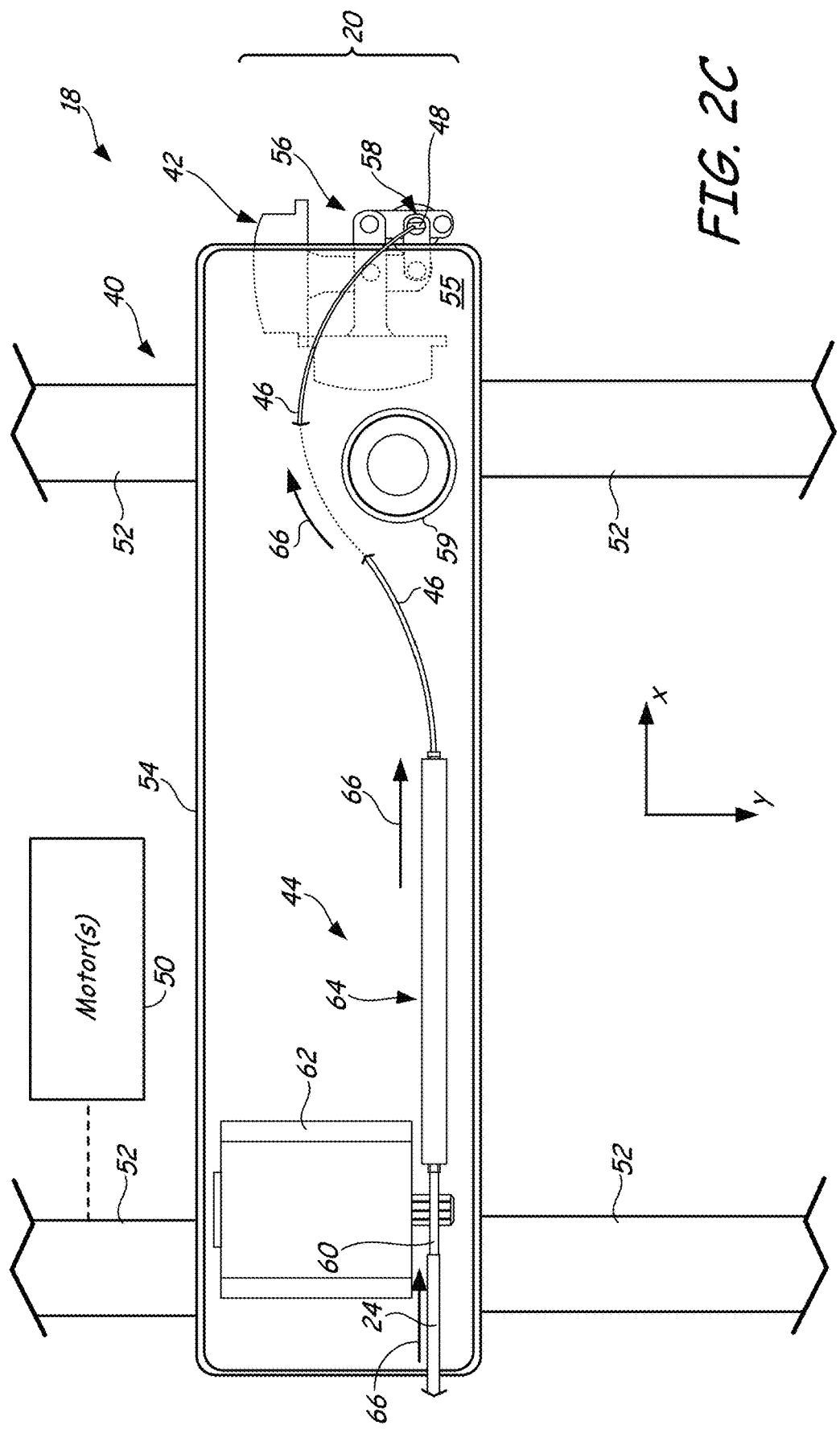

PRINT ASSEMBLY FOR ADDITIVE MANUFACTURING SYSTEM, AND METHODS OF USE THEREOF

CROSS-REFERENCE TO RELATED APPLICATION(S)

This Application is a 371 National Stage Application of International Application No. PCT/US2015/052681, filed on Sep. 28, 2015, published as International Publication No. WO2016/049640, which claims priority to U.S. Patent Application No. 62/056,200, filed on Sep. 26, 2014 and U.S. Patent Application No. 62/056,186, filed on Sep. 26, 2014, the contents of which are incorporated by reference in their entireties.

BACKGROUND

The present disclosure relates to additive manufacturing systems for printing or otherwise producing three-dimensional (3D) parts and support structures. In particular, the present disclosure relates to print assemblies having liquefier assemblies and associated robotic positioners (e.g., gantries) for printing 3D parts and support structures in a layer-by-layer manner using an additive manufacturing technique.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, digital light processing (DLP), and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed to a print assembly for use in an additive manufacturing system to print 3D parts. The print assembly includes a coarse positioner, a fine positioner, and a liquefier assembly, where a portion of the liquefier assembly is operably mounted to the fine positioner such that the fine positioner is configured to move the portion of the liquefier assembly relative to the coarse positioner.

Another aspect of the present disclosure is directed to a print assembly for use in an additive manufacturing system to print 3D parts, which includes a first robotic positioner, and a second robotic positioner that is operably mounted to the first robotic positioner such that the first robotic positioner is configured to move the second robotic positioner over a first range of motion. The print assembly also includes a liquefier assembly having a first stage and a second stage connected to the first stage, where the second stage is mounted to the second robotic positioner, and where the second robotic positioner is configured to move the second stage of the liquefier assembly in a second range of motion relative to the first robotic positioner that is less than the first range of motion of the first robotic positioner.

Another aspect of the present disclosure is directed to a print assembly for use in an additive manufacturing system to print 3D parts, which includes a first robotic positioner, and a second robotic positioner that is operably mounted to the first robotic positioner such that the first robotic positioner is configured to move the second robotic positioner, where the second robotic positioner has a higher fundamental resonance frequency than the first robotic positioner, and a liquefier assembly configured to melt and extrude a consumable material, where a portion of the liquefier assembly is operably mounted to the second robotic positioner.

Another aspect of the present disclosure is directed to a print assembly for use in an additive manufacturing system to print 3D parts, which includes a coarse positioner, a fine positioner operably mounted to the coarse positioner such that the coarse positioner is configured to move the fine positioner in an x-y plane, and a liquefier assembly comprising a first stage and a second stage connected to the first stage, where the second stage is mounted to the fine positioner, and where the fine positioner is configured to move the second stage of the liquefier assembly relative to the coarse positioner.

Another aspect of the present disclosure is directed to an additive manufacturing system for printing 3D parts. The additive manufacturing system includes a first robotic positioner, a second robotic positioner operably mounted to the first robotic positioner, and a liquefier assembly comprising a first stage and a second stage, where the second stage is operably mounted to the second robotic positioner. The system also includes a controller assembly configured to command the first robotic positioner to move the second robotic positioner, to command the second robotic positioner to move the second stage of the liquefier assembly relative to the first robotic positioner, and to command the liquefier assembly to controllably melt and extrude a consumable material.

Another aspect of the present disclosure is directed to a method for printing a 3D part with an additive manufacturing system. The method includes moving a fine positioner in an x-y plane with a coarse positioner, moving (with the fine positioner) a portion of a liquefier assembly in the x-y plane relative to the coarse positioner, and melting and extruding a consumable material in the liquefier assembly to print the 3D part in a layer-by-layer manner.

Another aspect of the present disclosure is directed to a print assembly for use in an additive manufacturing system to print 3D parts, which includes a first robotic positioner, and a second robotic positioner operably mounted to the first robotic positioner such that the first robotic positioner is configured to move the second robotic positioner over a first range of motion. The print assembly also includes a liquefier assembly having a first portion (e.g., a first stage, a liquefier stage, a liquefier portion, and the like) and a second portion (e.g., a second stage, an accumulator stage, an extrusion nozzle, and the like) connected to the first portion (e.g., with a conduit), wherein the second portion is mounted to the second robotic positioner, and wherein the second robotic positioner is configured to move the second portion of the liquefier assembly in a second range of motion relative to the robotic positioner that is less than the first range of motion of the first robotic positioner.

Definitions

Unless otherwise specified, the following terms as used herein have the meanings provided below:

The term "operably connected", with reference to articles being operably connected to each other, refers to direct connections (physically in contact with each other) and indirect connections (connected to each other with one or more additional components, such as spacers, disposed between them).

The terms "command", "commanding", and the like, with reference to a controller assembly commanding a device (e.g., a drive mechanism, an actuator, or the like), refers to the direct and/or indirect relaying of control signals from the controller assembly to the device such that the device operates in conformance with the relayed signals. The signals may be relayed in any suitable form, such as communication signals to a microprocessor on the device, applied electrical power to operate the device, and the like.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "at least one" and "one or more of an element are used interchangeably, and have the same meaning that includes a single element and a plurality of the elements, and may also be represented by the suffix "(s)" at the end of the element.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 2B is a top view of an alternative embodiment for the print assembly, in which liquefier assemblies and fine positioners are secured to individual effectors of a coarse positioner.

FIG. 2C is a top view of another alternative embodiment for the print assembly, in which in which each liquefier assembly and fine positioner is used with an individual coarse positioner. This embodiment also illustrates a print assembly having a single liquefier assembly and fine positioner.

DETAILED DESCRIPTION

The present disclosure is directed to a print assembly for use in an additive manufacturing system to print 3D parts and support structures in a layer-by-layer manner using an additive manufacturing technique. The print assembly includes two or more robotic positioners (e.g., gantries) that provide a coarse-fine position control. The print assembly also includes one or more liquefier assemblies retained by the robotic positioners for melting and extruding consumable materials to print the 3D parts and support structures. Preferably, the liquefier assemblies are multiple-stage liquefier assemblies, although single-stage liquefier assemblies may also optionally be used.

As discussed below, the print assembly overcomes multiple limitations in current print head gantries, such as acceleration and deceleration limitations due to fundamental or natural resonance frequencies of the print head gantries. In particular, the print assembly can effectively provide a coarse-fine position control (with the robotic positioners), as well as a coarse-fine extrusion control (with the multiple-stage liquefier assemblies). This allows the print assembly to produce 3D parts with good part resolutions and fast printing speeds, even negotiating when tortuous tool paths, such as tool paths with sinusoidal geometries, sharp corners, sharp 180-degree turns, and the like.

Figure 1:
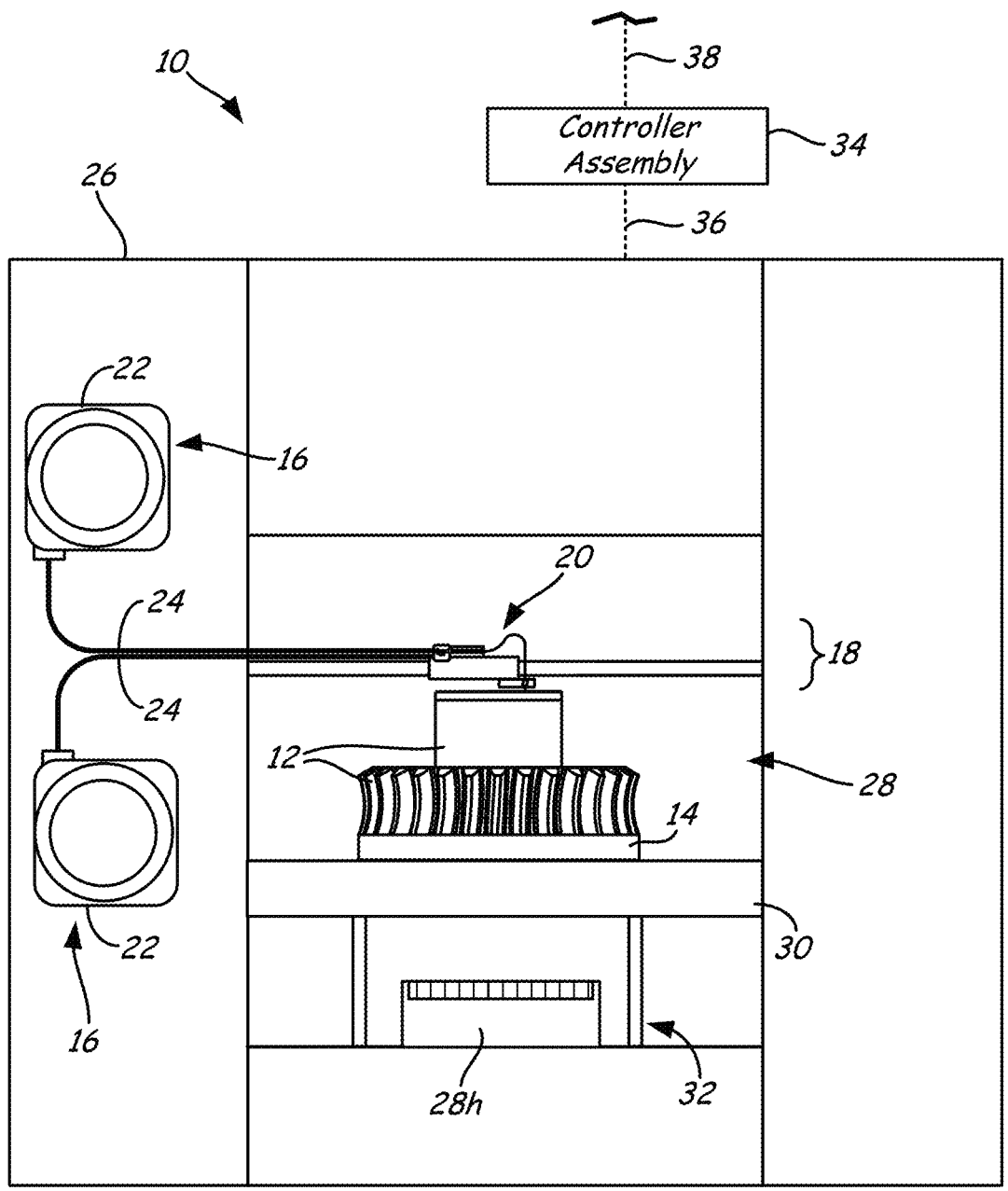
FIG. 1 is a front view of an additive manufacturing system configured to print 3D parts and support structures with the use of a print assembly of the present disclosure.

The print assembly may be used with any suitable additive manufacturing system. For instance, system 10 is an example additive manufacturing system for printing 3D parts or models and corresponding support structures (e.g., 3D part 12 and support structure 14) using a layer-based, additive manufacturing technique. Suitable additive manufacturing systems for system 10 include extrusion-based systems developed by Stratasys, Inc., Eden Prairie, Minn., such as fused deposition modeling systems under the trademark "FDM". In the shown embodiment, 3D part 12 and support structure 14 are respectively printed from part and support materials of consumable assemblies 16 with the use of print assembly 18 of the present disclosure, where print assembly 18 includes a pair of liquefier assemblies 20 (only a single liquefier assembly 20 is shown in FIG. 1, the second being located behind it).

Consumable assemblies 16 each include a container portion 22, which is an easily loadable, removable, and replaceable container device that retains a supply of a consumable filament for printing with system 10. Each container portion 22 may retain the consumable filament on a wound spool, a spool-less coil, or other supply arrangement, such as discussed in Swanson et al., U.S. Pat. No. 7,374,712; Taatjes at al., U.S. Pat. No. 7,938,356; Mannella et al., U.S. Publication Nos. 2013/0161432 and 2013/0161442; and Batchelder et al., U.S. Publication No. 2014/0158802.

In alternative embodiments, container portions 22 may be replaced with other supply sources of consumable materials, where the consumable materials may be any suitable media type, such as filaments, powders, pellets, slugs, and the like. For instance, in embodiments in which the consumable materials are provided in powder form, container portions 22 may be replaced with one or more hoppers, such as discussed in Bosveld et al., U.S. Publication No. 2013/0333798.

Each container portion 22 preferably engages with a guide tube 24, which interconnects the container portion 22 to its associated print assembly 18. Accordingly, drive mechanisms of print assembly 18 (and/or of system 10) draw successive segments of the consumable filaments from container portions 22, through guide tubes 24, to the liquefier assemblies 20 of print assembly 18.

In some embodiments, print assembly 18 and guide tubes 24 are fixed sub-components of system 10, and each consumable assembly 16 includes a container portion 22 and the retained consumable filament. However, in alternative embodiments, portions of print assembly 18, container portion 22, and guide tube 24 are sub-components of consumable assembly 16, such that the given portions of print assembly 18, container portion 22, and guide tube 24 are collectively replaced in an interchangeable manner, as discussed in Swanson, U.S. Pat. No. 8,403,658.

As further shown in FIG. 1, system 10 includes also system casing 26, chamber 28, platen 30, and platen gantry 32. System casing 26 is a structural component of system 10 and may include multiple structural sub-components such as support frames, housing walls, and the like. In some embodiments, system casing 26 may include container bays or other receiving areas configured to receive container portions 22 of consumable assemblies 16. In alternative embodiments, the container bays may be omitted to reduce the overall footprint of system 10. In these embodiments, container portions 22 may stand adjacent to system casing 26, while providing sufficient ranges of movement for guide tubes 24 and liquefier assemblies 20.

Chamber 28 is an example build environment that contains platen 30 for printing 3D part 12 and support structure 14, where chamber 28 may be may be optionally omitted and/or replaced with different types of build environments. For example, 3D part 12 and support structure 14 may be built in a build environment that is open to ambient conditions or may be enclosed with alternative structures (e.g., flexible curtains). In the shown example, the interior volume of chamber 28 may be heated with heater 28$h$ to reduce the rate at which the part and support materials solidify after being extruded and deposited (e.g., to reduce distortions and curling). Heater 28$h$ may be any suitable device or assembly for heating the interior volume of chamber 28, such as by radiant heating and/or by circulating heated air or other gas (e.g., inert gases). In alternative embodiments, heater 28$h$ may be replaced with other conditioning devices, such as a cooling unit to generate and circulate cooling air or other gas. The particular thermal conditions for the build environment may vary depending on the particular consumable materials used.

Platen 30 is a platform on which 3D part 12 and support structure 14 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309; may be fabricated from plastic, corrugated cardboard, or other suitable material; and may also include a flexible polymeric film or liner, painter's tape, polyimide tape, adhesive laminate (e.g., an applied glue), or other disposable fabrication for adhering deposited material onto the platen 30 or onto the build substrate. In some embodiments, platen 30 and/or the build substrate may be heated, such as with one or more electrically-resistive heating elements.

Platen gantry 32 is a robotic positioner (e.g., a gantry) configured to move platen 30 along (or substantially along) the vertical z-axis. Platen gantry 32 may operate with one or more motors (e.g., stepper motors and encoded DC motors), gears, pulleys, belts, screw drives, linear portals, robotic arms, delta configurations, hexapods, and the like. As discussed below, in some embodiments, platen gantry 32 may function as a coarse positioner of print assembly 18. In other embodiments, platen gantry 32 may be omitted, and platen 30 may be fixedly mounted in chamber 28.

System 10 also includes controller assembly 34, which is one or more computer-based systems configured to operate the components of system 10. Controller assembly 34 may communicate over communication line 36 with the various components of system 10, such as print assembly 18, chamber 28 (e.g., heater 28$h$), head carriage 34, motors for platen gantry 32, and various sensors, calibration devices, display devices, and/or user input devices. In some embodiments, controller assembly 34 may also communicate with one or more of platen 30, platen gantry 32, and any other suitable component of system 10.

Additionally, controller assembly 34 may also communicate over communication line 38 with external devices, such as other computers and servers over a network connection (e.g., an internet connection, a local area network (LAN) connection, a universal serial bus (USB) connection, a cellular connection, and the like). While communication lines 36 and 38 are each illustrated as a single signal line, they may each include one or more electrical, optical, and/or wireless signal lines and intermediate control circuits, where portions of communication line(s) 36 may also be subcomponents of print assembly 18. For instance, in some embodiments, communication line(s) 36 may include wireless components for communicating with devices that accelerate and decelerate quickly (e.g., high-g-force gantries), where physical cable reliability could potentially be an issue.

In some embodiments, the one or more computer-based systems of controller assembly 34 are internal to system 10, allowing a user to operate system 10 over a network communication line 38, such as from an external computer in the same or similar manner as a two-dimensional printer. Alternatively, controller assembly 34 may also include one or more external computer-based systems (e.g., desktop, laptop, server-based, cloud-based, tablet, mobile media device, and the like) that may communicate with the internal computer-based system(s) of controller assembly 34, as well as communicating over a network via communication line 38.

In this alternative embodiment, the processing functions of controller assembly 34 discussed below may be divided between the internal and external computer-based systems. In yet another alternative embodiment, the computer-based system(s) of controller assembly 34 may all be located external to system 10 (e.g., one or more external computers), and may communicate with system 10 over communication line 36.

Current extrusion-based additive manufacturing or 3D printing systems have gained popularity in a variety of industries due to their capabilities for printing strong 3D parts from a variety of materials, with low support material requirements, accurate depositions, and relatively low costs. However, there has been an increasing demand for higher-resolution parts and faster printing speeds, which can push the limits of what current extrusion-based systems can achieve in terms of accuracies and printing speeds.

For example, current head gantries are capable of moving print heads along linear and other simple tool paths at high velocities with accurate depositions. However, the print heads are typically slowed down to negotiate tortuous tool paths, such as tool paths with sinusoidal geometries, sharp corners, sharp 180-degree turns, and the like. In these cases, the print heads also typically reduce their extrudate volumetric flow rates when negotiating the corners to maintain accurate deposition volumes.

As such, to preserve printing speeds as much as possible, it is desirable to have a print head travel into a tortuous tool path (e.g., a sharp corner) at a fast velocity, decelerate quickly and negotiate the tortuous tool path, and then quickly accelerate back up to the fast velocity. This minimizes the time that the print head remains at the reduced velocity, which can otherwise accumulate over numerous tortuous tool paths in a 3D part.

The accelerations and decelerations of a print head, however, are limited by the fundamental or natural resonance frequency of the gantry moving the print head. If a gantry accelerates or decelerates the print head too quickly, for example, such that the natural gantry resonances are excited, it will induce x-y position errors that can reduce deposition accuracies. As such, there is a physical limit to how fast a print head can be accelerated and decelerated (to increase overall printing speeds) without detrimentally affecting the deposition accuracies.

Figure 2A:
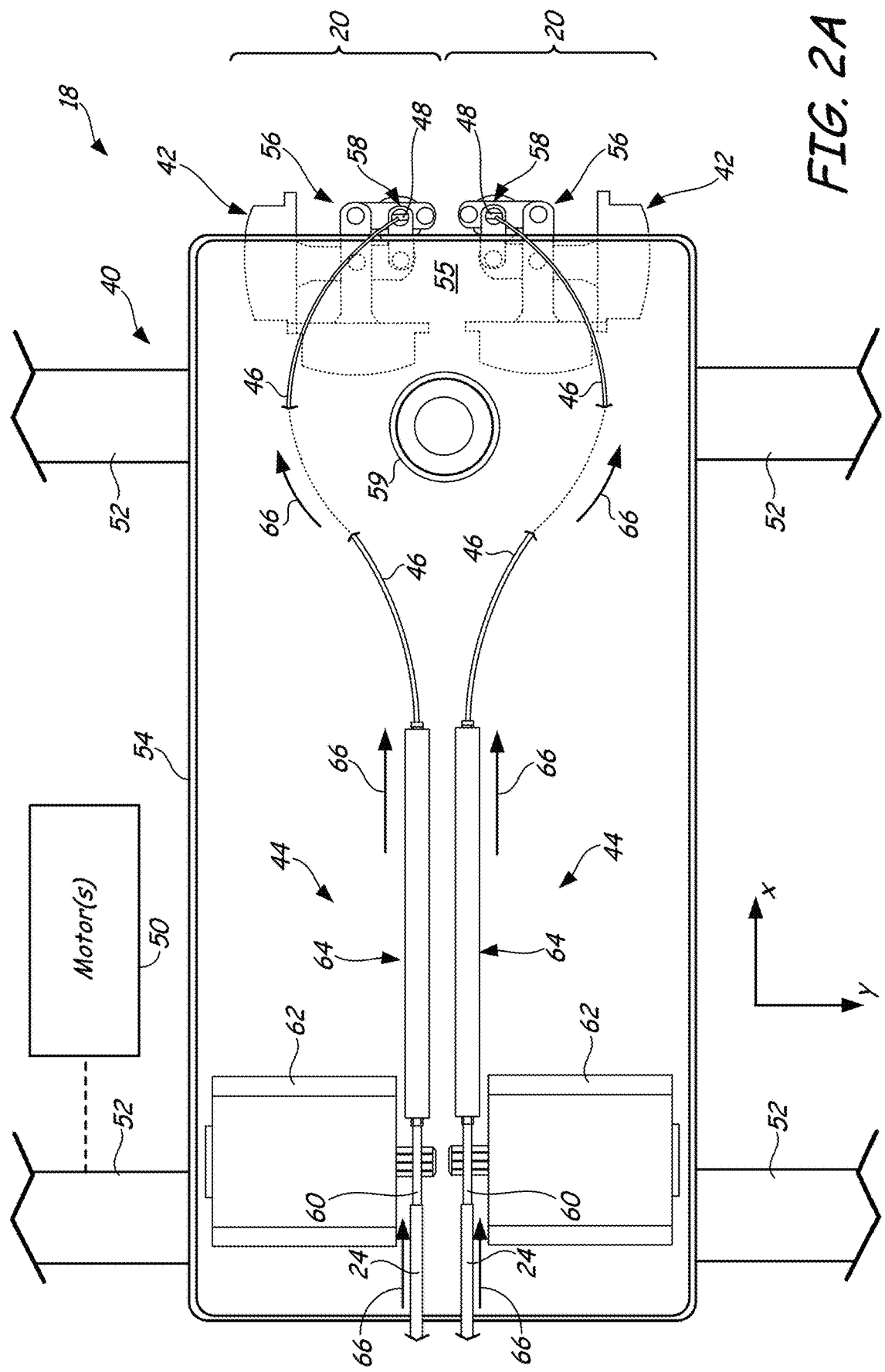
FIG. 2A is a top view of the print assembly.

The print assembly 18, however, is capable of increasing printing speeds beyond the physical limits of current single-stage gantries, while also preserving deposition accuracies. This is achieved through the use of two or more robotic positioners having increasing-positional accuracies in the x-y plane. For example, as shown in FIG. 2A, print assembly 18 may include a shared coarse positioner 40, as well as a pair of fine-position gantries 42. As mentioned above, print assembly 18 also includes a pair of liquefier assemblies 20, each of which is preferably a multiple-stage assembly. For instance, each liquefier assembly 20 may include an upstream liquefier stage 44, an interconnecting conduit 46, and a downstream accumulator stage 48. Alternatively, in embodiments in which liquefier assembly 20 is a single-stage liquefier assembly, downstream accumulator stage 48 may be replaced with an extrusion nozzle, where the drive control is determined by liquefier stage 44.

Coarse positioner 40 is a first robotic positioner that includes one or more motors 50, gantry rails 52, and effector 54. Motor(s) 50 may be any suitable motors, such as one or more stepper motors, encoded DC motors, hydraulic motors, piezoelectric motors, and the like. Based on commands from controller assembly 38, motor(s) 50 operably move effector 54 along gantry rails 52 in (or substantially in) a horizontal x-y plane above platen 30, or at least along a single axis.

Examples of suitable robotic positioners for coarse positioner 40 include those disclosed in Swanson et al., U.S. Pat. No. 6,722,872; and Comb et al., U.S. Publication No. 2013/0078073, where coarse positioner 40 may also support deformable baffles (not shown) that define a ceiling for chamber 28. While illustrated as a bridge-type gantry, coarse positioner 40 may utilize any suitable robotic mechanism for moving effector 54, such as with gears, pulleys, belts, screw drives, linear portals, robotic arms, delta configurations, hexapods, and the like.

As shown, coarse positioner 40 moves effector 54 in the x-y plane above platen 30, where effector 54 itself retains liquefier assemblies 20 and fine positioner 42. This can result in a payload up to about 5 or even 10 pounds. Due to its larger size and payload requirements, coarse positioner 40 has a lower fundamental resonance frequency, which restricts its ability to quickly accelerate and decelerate effector 54. For example, coarse positioner 40 may accelerate and decelerate effector 54 with up to about ten gees, more typically up to about five gees, and in some cases, up to about three gees, without inducing x-y position errors. While coarse positioner 40 may alternatively be manufactured to have a higher fundamental resonance frequency (e.g., using stiffer materials), such gantries can be very expensive to produce, rendering them less suitable for lower-cost designs.

Effector 54 is a first carriage or other effector unit movably supported by gantry rails 52, and, in the shown embodiment, is shared by the pair of liquefier assemblies 20 and fine positioners 42. Accordingly, effector 54 may securely retain and support each fine positioner 42 and each upstream liquefier stage 44, preferably in a manner that prevents or restricts their movements relative to effector 54. Effector 54 also preferably includes one or more encoders, tachometers, accelerometers, and/or other motion-control sensors 55 located adjacent to one or both of fine positioners 42, where sensor(s) 55 may communicate with controller assembly over communication line 36.

Each fine positioner 42 is a second robotic positioner that includes miniactuator 56 and effector 58. Based on commands from controller assembly 34, miniactuator 56 may move effector 58 in the x-y plane above platen 30 in a manner that supplements the movements of effector 54 (by coarse positioner 40). In some embodiments, miniactuator 56 may also move effector 58 along the z-axis, such as for servoing or toggling one or both effectors 58 and accumulator stages 48 between active and standby states for selective deposition of the consumable materials.

In comparison to coarse positioner 40, each fine positioner 42 has a high fundamental resonance frequency, allowing it to quickly accelerate and decelerate its associated effector 58. For example, fine positioner 42 can accelerate and decelerate effector 58 (and the retained accumulator stage 48) with maximum rates greater than about 30 gees, more preferably greater than about 40 gees, and in some embodiments on the order of about 50 gees or greater, without inducing x-y position errors.

However, due its smaller size, fine positioner 42 is limited to a small range of motion in the x-y plane, such up to about one square inch. As such, the fast accelerations and decelerations of fine positioner 42 may supplement the slower accelerations and decelerations of coarse positioner 40 to achieve accurate depositions at fast printing speeds, even when negotiating tortuous tool paths.

Each effector 58 is a second effector unit movably supported by its associated miniactuator 56. Each effector 58 may securely retain and support its associated accumulator stage 48 in a manner that prevents or restricts its movement relative to effector 58.

As further shown in FIG. 2A, coarse positioner 40 may also retain one or more torque compensators, such as torque compensator 59. Torque compensator(s) 59 is a motor configured to counteract or otherwise dampen the high-speed torques generated by fine positioners 42.

As mentioned above, each liquefier assembly 20 is separated into multiple stages, such as upstream liquefier stage 44 and downstream accumulator stage 48 (connected by conduit 46). The multiple stages are preferred because, in order to achieve the fast accelerations and decelerations, fine positioner 42 cannot carry heavy loads. In fact, the low-mass payload limit of fine positioner 42 can be less than about 50 grams, less than about 20 grams, or even less than about 10 grams. This payload limit is significantly less than the weights of current extrusion-based print heads. Accordingly, separating liquefier assembly 20 into multiple stages allows the heavier components (e.g., liquefier stage 44) to be securely mounted on effector 54 of coarse positioner 40 (or at a fixed location in system 10), and allows the lighter nozzle-portion (e.g., accumulator stage 48) to be mounted on effector 58 of fine positioner 42.

Of course, this solution can create an issue with response time delays. Briefly, there is a time response delay between when the upstream liquefier stage 44 is commanded to change the feed rate, and when the extrudate flow rate from the downstream accumulator stage 48 actually changes. Accumulator stage 48 may include an actuator mechanism to generate fast-responding surges and draw backs of the extrudate. These fast-responding surges and draw backs can supplement the slower-reacting pumping from the upstream liquefier stage.

While illustrated with two liquefier assemblies 20 and two fine positioners 42, print assembly 18 may alternatively include three or more liquefier assemblies 20 and three or more fine positioners 42 for printing three or more consumable materials. Examples of suitable numbers of liquefier assemblies 20 (and fine positioners 42) for print assembly 18 range from one to ten, from one to eight, from one to six, from one to four, and/or from one to two.

Furthermore, one or more of the fine positioners 42 may be mounted to coarse positioner 40 with z-axis servo mechanisms (not shown), such as with magnetic voice-coil mechanisms. In these embodiments, controller assembly 34 may command the z-axis servo mechanism(s) to servo or toggle the fine positioner(s) 42 between active and standby states for selective deposition of the consumable materials. For example, one of the fine positioners 42 may be cammed or otherwise moveable along the z-axis relative to coarse positioner 40, and the other fine positioner 42 may be fixedly mounted to coarse positioner 40.

In yet another embodiment, fine positioners 42 are each mounted such that the nozzle tips of accumulator stages 48 are substantially level with each other along the z-axis. Moreover, in some embodiments, multiple liquefier assemblies 20 may extrude at the same time, where the fine positioners 42 may independently move their respective accumulator stages 48 in the x-y plane during the simultaneous extrusions. This can further increase printing speeds by printing multiple portions of the same 3D part 12 (or multiple 3D parts 12) at the same time. As can be appreciated, the use of the multiple and separate fine positioners 42 and accumulator stages 48 in this manner can provide an additional level of print control that is not otherwise achievable with print heads that are fixed relative to each other in the x-y plane.

Additionally, while coarse positioner 40 and effector 54 are each illustrated as being shared by the multiple liquefier assemblies 20 and fine-position gantries 42, in alternative embodiments, such as shown in FIG. 2B, each liquefier assembly 20 and fine positioner 42 may be secured to and supported by its own effector 54. In this example, each effector 54 may share the remaining components of coarse positioner 40 (e.g., shared motor(s) 50 and gantry rails 52), where the first effectors 54 may be moved together or independently of each other, as desired.

In further alternative embodiments, such as shown in FIG. 2C, each liquefier assembly 20 and fine positioner 42 may use its own coarse positioner 40 (e.g., its own motor(s) 50, gantry rails 52, and effector 54). This arrangement is similar to an embodiment in which system 10 only operates with a single liquefier assembly 20, such as for printing 3D part 12 without a support structure. One benefit of this embodiment is that the payload of each coarse positioner 40 is reduced.

Figure 2D:
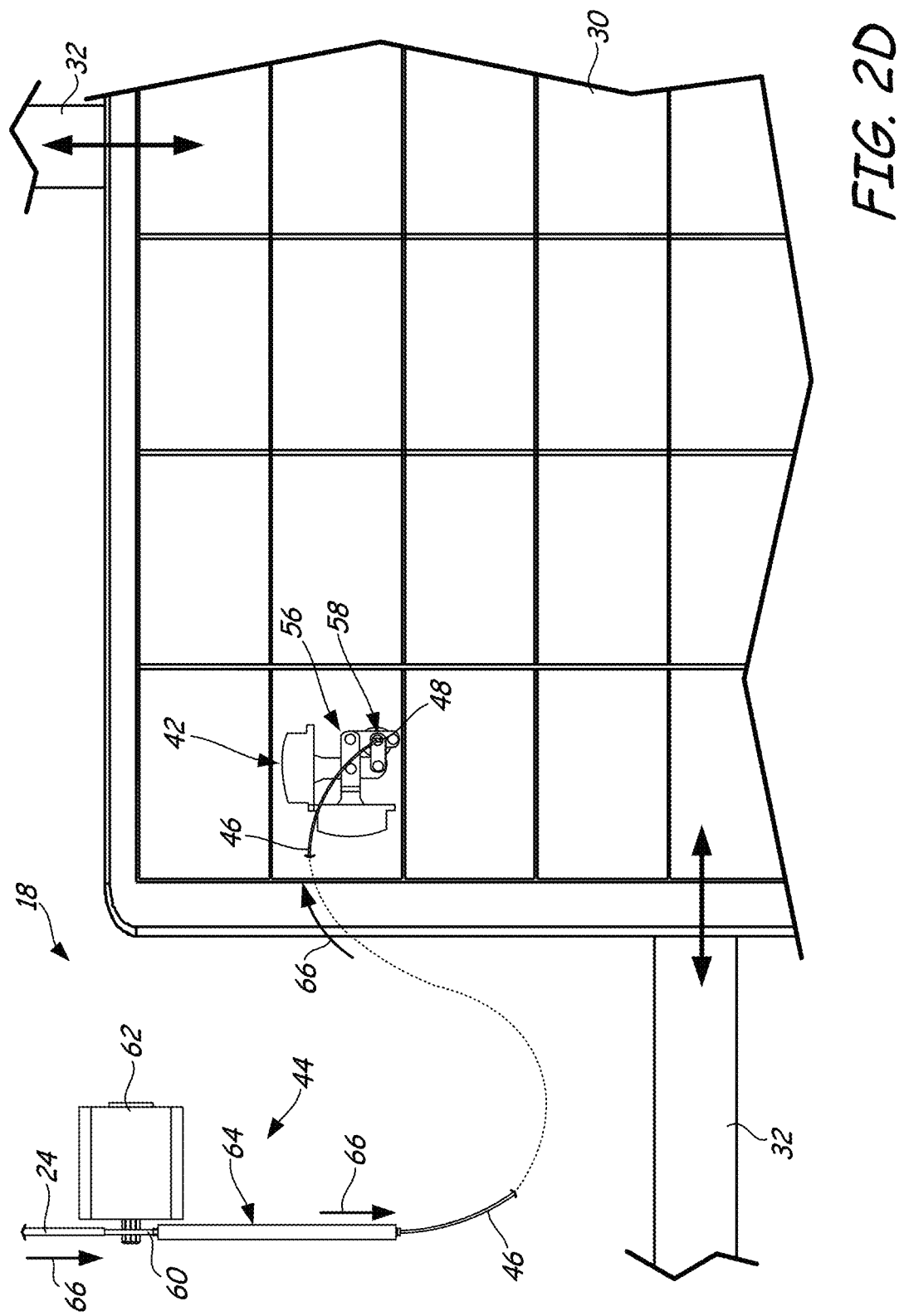
FIG. 2D is a top view another alternative embodiment for the print assembly, in which the coarse positioner moves a platen, and is separate from the fine positioner.

In another alternative arrangement, such as shown in FIG. 2D, platen gantry 32 may function as the coarse positioner for moving platen 30 (and 3D part 12 and support structure 14) in the horizontal x-y plane below each accumulator stage 48. In this embodiment, coarse positioner 40 may be omitted, and each fine positioner 42 may be mounted at a fixed locations in or above chamber 28, such that its associated accumulator stage 48 is positionable over platen 30. Each liquefier stage 44 may be mounted at any suitable fixed location of system 10 (inside or outside of chamber 28) such that the associated conduit 46 may interconnect stages 44 and 48. A torque compensator 59 (not shown) may also optionally be included to counteract or otherwise dampen the high-speed torques generated by fine positioner 42.

In this case, platen gantry 32 is capable of moving below each accumulator stage 48, but is limited to slower accelerations and decelerations due to its lower fundamental resonance frequency, as discussed above for coarse positioner 40. In comparison, each fine positioner 42 is capable of moving its associated effector 58 and accumulator stage 48 over a small area (e.g., one square inch), but is capable of achieving fast accelerations and decelerations. As such, controller assembly 34 may command fine positioner 42 to supplement the slower accelerations and decelerations of platen gantry 32 to achieve accurate depositions at high printing speeds, even when negotiating tortuous tool paths.

As can be seen from the above embodiments, fine positioner 42 may be operably secured to and moved by coarse positioner 42 (e.g., as shown in FIGS. 2A-2C), or may be separate from the coarse positioner (e.g., as shown in FIG. 2D). Moreover, as mentioned above, print assembly 18 may also incorporate three or more robotic positioners having increasing-positional accuracies in the x-y plane. For instance, platen gantry 32 may function as a third robotic positioner that operates with coarse positioner 40 and fine positioner 42. For example, platen gantry 32 may be commanded to operate with slower accelerations and decelerations than coarse positioner 40. In this case, controller assembly 34 may command coarse positioner 40 to supplement the relatively slower accelerations and decelerations of platen gantry 32, and may also command fine positioner 42 to supplement the relatively slower accelerations and decelerations of coarse positioner 40.

Other similar arrangements may also be used such that one or both of platen 30 and accumulator stage 48 of liquefier assembly 20 are moveable relative to each other. For instance, coarse positioner 40 may be a robotic arm, delta configuration, hexapod, or other robotic mechanism capable of moving in all three x-y-z dimensions. In this embodiment, platen gantry 32 may optionally be omitted, platen 30 may be fixedly retained in chamber 28.

Platen 30 and accumulator stages 48 may also be oriented along different axes. For example, platen 30 may be oriented vertically and accumulator stages 48 may print 3D part 12 and support structure 14 along the x-axis or the y-axis. In another example, platen 30 and/or accumulator stages 48 may be moved relative to each other in a non-Cartesian coordinate system, such as in a polar coordinate system.

Each liquefier assembly 20 is preferably associated with one or more consumable assemblies 16 and guide tubes 24 to feed a consumable filament (referred to as filament 60) to upstream liquefier stage 44 of liquefier assembly 20. During a printing operation, controller assembly 34 may command platen gantry 32 to move platen 30 to a predetermined height within chamber 28. Controller assembly 34 may then command coarse positioner 40 and/or fine positioner 42 to move accumulator stage 48 around in the horizontal x-y plane above platen 30. Controller assembly 34 may also command liquefier stages 44 to selectively draw successive segments of filaments 60 (or other consumable materials) from container portions 22 and through guide tubes 24, respectively.

The successive segments of each filament 60 are then melted in liquefier stage 44 of the respective liquefier assembly 20 to produce a molten material. The movement of the solid portion of filament 60 functions as a viscosity pump to push the molten material under pressure from liquefier stage 44, through conduit 46, and into accumulator stage 48 for extrusion.

Upon exiting accumulator stage 48, the resulting extrudate may be deposited onto platen 30 as a series of roads for printing 3D part 12 or support structure 14 in a layer-by-layer manner. For example, 3D part 12 or support structure 14 may be printed or otherwise built in three dimensions by producing successive layers of the deposited roads in two-dimensional, cross-sectional patterns stacked on top of each other. In some applications, such as discussed in Crump, U.S. Pat. No. 5,121,329, the deposited roads may also extend into free space above the x-y build plane, such as with vertically-extending curved arcs. After the print operation is complete, the resulting 3D part 12 and support structure 14 may be removed from chamber 28, and support structure 14 may be removed from 3D part 12. 3D part 12 may then undergo one or more additional post-processing steps, as desired.

The following discussion of print assembly 18 is made with reference to a single liquefier assembly 20 and fine positioner 42 in use with a coarse positioner 40 (e.g., as shown in FIG. 2C) with the understanding that the same discussion may apply to each of the above-discussed embodiments. As shown, liquefier stage 44 includes drive mechanism 62 and liquefier portion 64, and may also optionally include a housing (not shown) having any suitable design for protecting drive mechanism 62. If a housing is used, guide tube 24 preferably engages the housing or otherwise directs filament 60 into the housing, and liquefier portion 64 may extend from the housing. Liquefier stage 44 also preferably includes one or more temperature sensors, pressure sensors, flow sensors, and the like, which communicate with controller assembly 34 (e.g., via communication line 36). As discussed herein liquefier assembly 20 is utilized with fine positioner 42 in use with coarse positioner 40. However, the liquefier assembly 20 can be utilized in any additive manufacturing system and is not limited to use with fine positioner 42 in use with coarse positioner 40.

Drive mechanism 62 is a motorized device for feeding filament 60 (or other consumable material), such as with one or more rotatable wheels, gears, shafts, and/or screws that are operably connected to one or more motors (e.g., electric stepper and encoded DC motors). Examples of suitable devices for drive mechanism 62 include knurled, geared, or toothed-based wheels, such as discussed in LaBossiere et al., U.S. Pat. Nos. 7,384,255 and 7,604,470. Additional examples include internally-threaded components (e.g., helical coils), such as disclosed in Batchelder et al., U.S. Pat. No. 7,896,209; and rotatable, toothed-shafts, such as disclosed in Swanson et al., U.S. Pat. No. 8,647,102; and Koop et al., U.S. Publication No. 2014/0159273. In some preferred embodiments, drive mechanism 62 includes a toothed drive wheel or gear for engagement with a filament 60 having surface tracks along its length, as discussed in Batchelder et al., U.S. Pat. No. 8,236,227. This allows drive mechanism 62 to feed the tracked filament 60 into liquefier 68 with a tractor-drive arrangement.

In the shown embodiment, drive mechanism 62 is a filament drive mechanism that is located upstream from liquefier portion 64, and is configured to feed successive segments of filament 60 from guide tube 24 to liquefier portion 64 under motorized power, based on commands from controller assembly 34. Drive mechanism 62 may also include any suitable bearing surface (e.g., a rotating bearing surface, not shown) configured to support the opposing side of filament 60 while drive mechanism 62 is engaged with filament 60. As used herein, the terms "upstream" and "downstream" are made with reference to a filament feed direction and a molten material flow direction, as illustrated by arrows 66.

While drive mechanism 62 is illustrated as being positioned directly upstream from liquefier portion 64, in alternative embodiments, one or more drive mechanisms may be positioned at any suitable location(s) along the pathway of filament 60 between (and including) container 22 and liquefier portion 64. For instance, in some embodiments, a spool drive mechanism (not shown) may be used to engage with a spool in container 22, where the spool holds a wound supply of filament 60. In this case, the spool drive mechanism may rotate the spool to feed filament 60 through guide tube 24 and into liquefier portion 64 (rather than directly engaging filament 60).

Alternatively, drive mechanism 62 may engage filament 60 through a port in liquefier portion 64, such as discussed in Batchelder et al., U.S. Pat. No. 7,897,074. In yet another embodiment, drive mechanism 62 may be located along guide tube 24 between container 22 and liquefier portion 64, and engage filament 60 through a port or intersection in guide tube 24. Furthermore, multiple drive mechanisms may be used together. For example, a first drive mechanism may be used to feed filament 60 from container 22 to liquefier portion 64. A second drive mechanism (e.g., drive mechanism 62) retained by effector 54 may then receive the fed filament 60 from the first drive mechanism, and feed the received filament 60 into liquefier portion 64.

Figure 3:
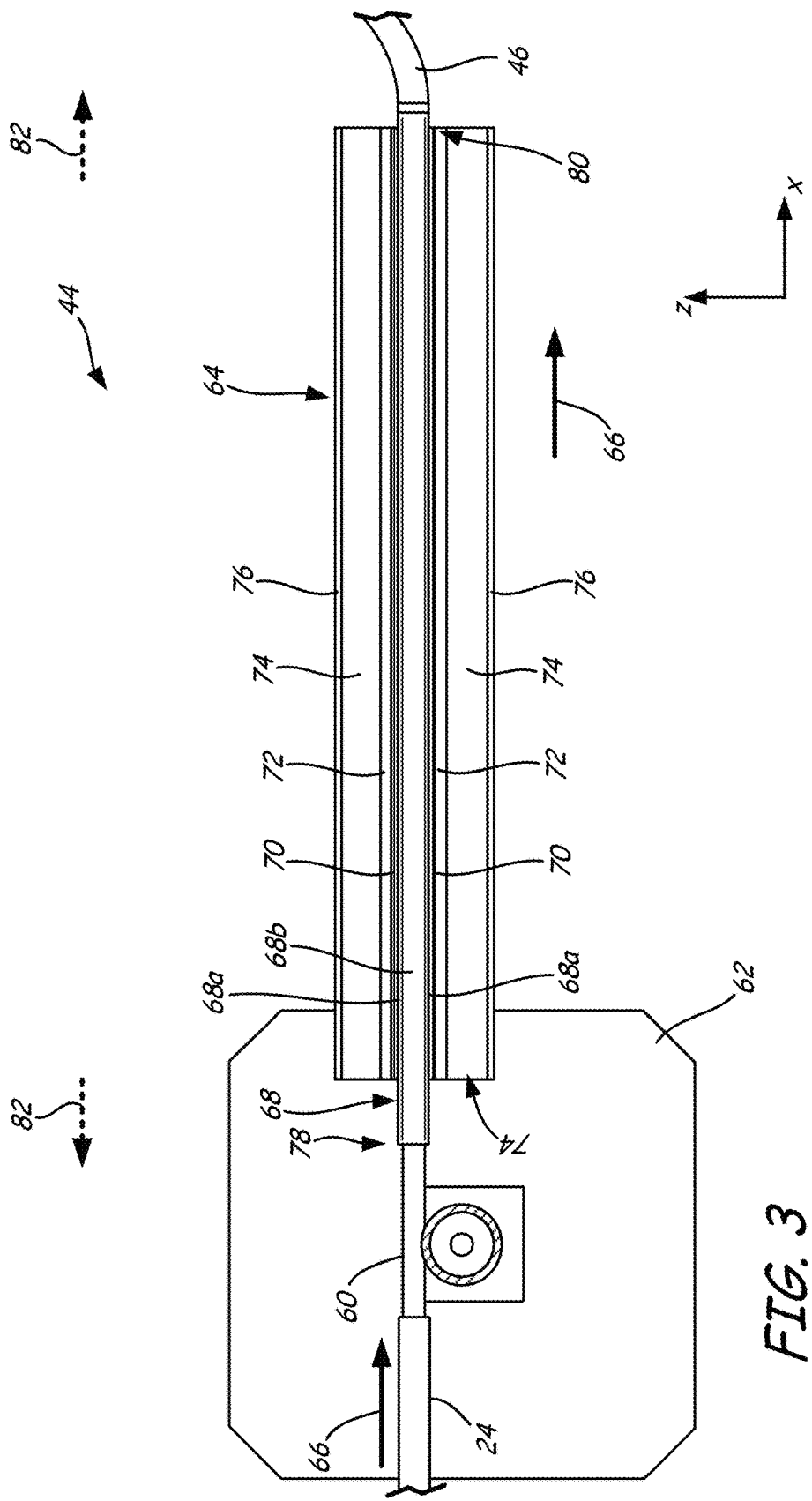
FIG. 3 is a front view of a liquefier stage and a conduit of the liquefier assembly in use with a consumable filament.
Figure 4:
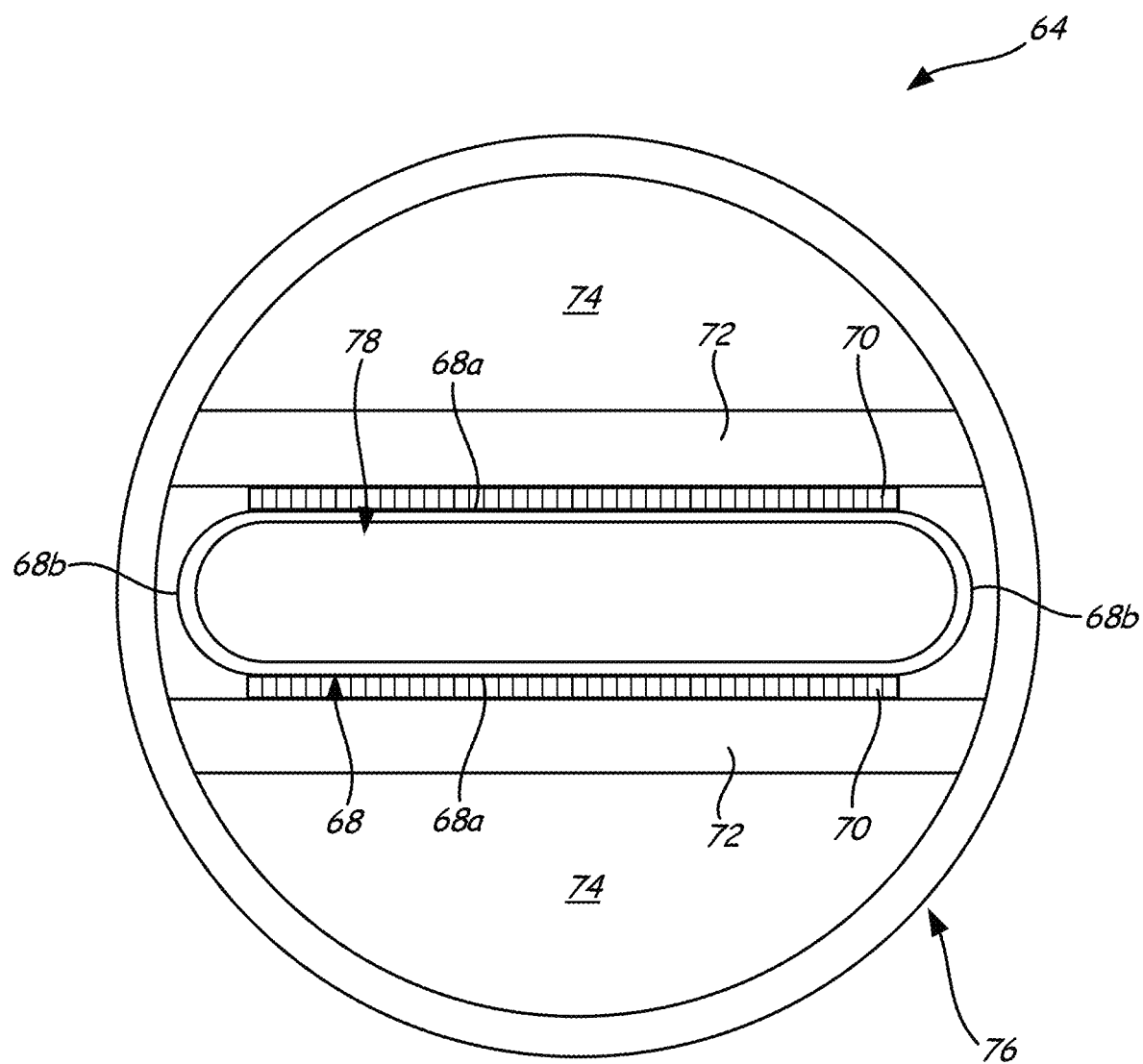
FIG. 4 is a inlet end view of the liquefier stage.

As best shown in FIGS. 3 and 4, liquefier portion 64 may include liquefier 68, heater assemblies 70, spacers 72 and 74, and frame 76. Liquefier portion 64 is discussed herein as having a ribbon liquefier architecture for use with a ribbon filament. The term "ribbon filament" as used herein refers to a filament (e.g., filament 60) having a substantially rectangular, arcuate, and/or an elliptical cross-section along its longitudinal length, which may include one or more surface tracks for engaging with drive mechanism 62, such as disclosed in Batchelder et al., U.S. Pat. No. 8,236,227. Correspondingly, the term "ribbon liquefier" as used herein refers to a hollow liquefier (e.g., liquefier 68) having a substantially rectangular, arcuate, and/or an elliptical hollow, inner-channel cross-section along its longitudinal length.

For each of the ribbon filament and the ribbon liquefier, the cross-section has a width and a thickness, where a maximum extent of the width is at least about 2.5 times greater than a maximum extent of the thickness. For a ribbon filament or ribbon liquefier having a substantially rectangular or arcuate cross-section, the cross-section may have sharp corners (i.e., 90-degree corners) and/or rounded corners. In aspects in which the ribbon filament has an elliptical cross-section, the elliptical cross-section preferably has an eccentricity of about 0.8 or greater, and more preferably of about 0.9 or greater. Examples of suitable ribbon filaments and ribbon liquefier architectures for filament 60 and liquefier portion 64 include those discussed in Batchelder et al., U.S. Pat. Nos. 8,221,669; 8,236,227; and 8,439,665.

Liquefier 68 includes opposing faces 68a and opposing lateral ends 68b, where faces 68a are the larger dimensions of liquefier 68 (corresponding to the width of liquefier 68) and lateral ends 68b are the smaller dimensions of liquefier 68 (corresponding to the thickness of liquefier 68). Liquefier 68 is preferably fabricated from one or more rigid, thermally-conductive materials, such as stainless steel, and may be fabricated in a variety of different manners. In a first example, the cross-sectional dimensions of liquefier 68 may be attained by flattening or otherwise collapsing or crushing a cylindrical liquefier, such as around a shim insert.

Alternatively, liquefier 68 may be produced by stamping a pair of metal sheets into half-sections, which may then be welded or otherwise sealed together to attain the desired cross-sectional dimensions. In a further example, a U-shaped trench may be laser cut or otherwise machined into a metal block to form the side walls of liquefier 68, which may then be covered with one or more metal membranes that encase the trench to form the inner channel In yet another example, liquefier 52 can be formed with silicon membranes that span a lithographically-formed channel or trench.

Liquefier 68 also has an inlet end 78 and an outlet end 80, which are preferably offset from each other along longitudinal axis 82. Inlet end 78 is configured to receive filament 60 from drive mechanism 62, where inlet end 78 and filament 60 preferably have complementary cross-sectional geometries, such as discussed in Batchelder et al., U.S. Pat. Nos. 8,221,669 and 8,439,665. Outlet end 80 is the downstream portion of liquefier 68 and terminates at conduit 46, preferably with a sealed engagement.

Suitable dimensions for liquefier 68 include those discussed in Batchelder et al., U.S. Pat. Nos. 8,221,669 and 8,439,665. In some preferred embodiments, liquefier 68 has a length along longitudinal axis 82 ranging from about 7.6 millimeters (about 0.3 inches) to about 130 millimeters (about 5 inches), more preferably from about 50 millimeters (about 2 inches) to about 100 millimeters (about 4 inches). Suitable hollow, inner-channel thicknesses between faces 68a range from about 0.25 millimeters (about 10 mils) to about 2.5 millimeters (about 100 mils), and in some embodiments from about 0.76 millimeters (about 30 mils) to about 1.3 millimeters (about 50 mils).

Suitable hollow, inner-channel widths between lateral ends 68b (perpendicular to the inner-channel widths) range from about 2.5 millimeters (about 100 mils) to about 10.2 millimeters (about 400 mils), in some embodiments from about 5.1 millimeters (about 200 mils) to about 7.6 millimeters (about 300 mils). Suitable wall thicknesses for liquefier 68 range from about 130 micrometers (about 5 mils) to about 500 micrometers (about 20 mils). The above-discussed widths and thicknesses for liquefier 68 are based on the maximum extents of the widths and thicknesses.

Heater assemblies 70 are one or more heating elements configured to conduct heat to liquefier 68 for melting the received filament 60 within liquefier 68, based on commands (e.g., received electrical power over line 36) from controller assembly 34. For instance, heater assemblies 70 may include one or more coils of resistive wire wrapped around liquefier 68, one or more heater blocks secured to liquefier 68, one or more electrical-resistance heaters secured to liquefier 68, one or more inductive heating elements, or any other suitable thermoelectric heating element(s) for heating liquefier 68 (and optionally, for cooling liquefier 68).

In the shown example, heater assemblies 70 are in mating contact with faces 68a of liquefier 68, such as disclosed in Batchelder et al., U.S. Pat. Nos. 8,221,669; 8,236,227; and 8,439,665; and in Batchelder et al., U.S. patent application Ser. No. 14/046,301. Alternatively (or additionally), one or more heater assemblies 70 may be located at one or both lateral ends 68b of liquefier 68.

Spacers 72 and 74 are each a pair of opposing optional spacer blocks or assemblies disposed between heater assemblies 70 and frame 76. Each spacer 72 and 74 is preferably produced from one or more materials that are relatively compliant to provide good mating interfaces between liquefier 68, heater assemblies 70, and frame 76, and that are strong enough to resist any expansion or ballooning effects of liquefier 68 due to internally-generated pressures.

In some embodiments, such as discussed in Batchelder et al., U.S. Patent Application Publication No. 2015/0097053, the material(s) for one or both of spacers 72 and 74 may also have modest thermal conductivities to draw heat from liquefier 68 and heater assemblies 70, and may also have sets of indentations (not shown) for thermally isolating separate heating zones. Suitable materials for spacers 72 and 74 include sheet silicate materials (e.g., sheet mica), aluminum, ceramic materials, and the like. In some alternative embodiments, spacers 72 and/or spacers 74 may be omitted, and liquefier 68 and (optionally) heater assemblies 70 may be directly retained by frame 76.

In a further embodiment, liquefier 68 may also incorporate a separately unique and beneficial feature. In this embodiment, liquefier 68, which is preferably thermally and electrically conductive, may directly receive an applied electrical current (e.g., via line 36) that can generate resistive heating along liquefier 68. Controller assembly 34 may also measure and monitor the temperature of liquefier 68 in real time from the resistance to the applied electrical current (e.g., via line 36). This effectively provides a self-heating and self-sensing liquefier.

In the shown example, frame 76 is a hollow cylindrical rigid frame for securely retaining liquefier 68, heater assemblies 70, and spacers 72 and 74, and for mounting liquefier portion 64 to effector 54 (or to another fixed location in system 10). In alternative embodiments, frame 76 may have any suitable geometry, such as a U-shaped, C-shaped, or V-shaped rigid frame, such that frame 76 preferably resists any expansion or ballooning effects of liquefier 68 due to internally-generated pressures. Frame 76 may be fabricated from one or more materials that provide a strong and rigid structure, such as one or more metals (e.g., stainless steel and aluminum). In further alternative embodiments, frame 76 may be omitted, if desired.

During the printing operation, drive mechanism 62 feeds successive segments of filament 60 into inlet end 78 of liquefier 68. In this case, filament 60 is pushed into inlet end 78. Alternatively, in a ported liquefier embodiment, such as discussed in Batchelder et al., U.S. Pat. No. 7,897,074, where drive mechanism 62 is located downstream from inlet end 78, drive mechanism 62 may feed successive segments of filament 60 into inlet end 78 by pulling filament 60 into inlet end 78.

As filament 60 passes through liquefier 68 in the direction of arrow 66, heater assemblies 70 thermally melt the received successive segments, where the molten portion of the filament material forms a meniscus around the unmelted portion of filament 60. The downward or forward movement of filament 60 functions as a viscosity pump to push the molten material through conduit 46 and into accumulator stage 48.

Figure 5:
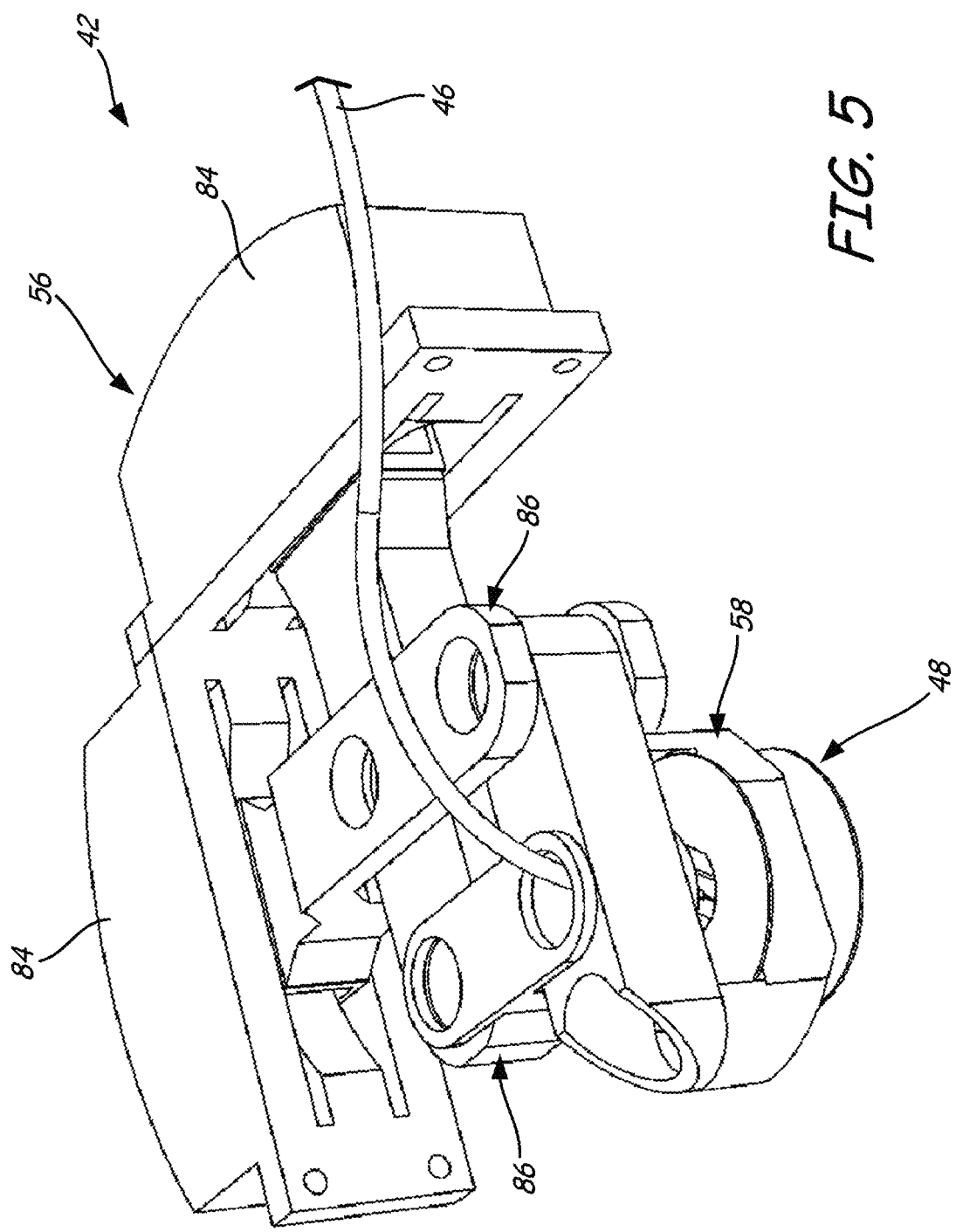
FIG. 5 is a top perspective view of an accumulator stage and conduit of the liquefier assembly in use with the fine positioner.

FIG. 5 illustrates an example fine positioner 42 in use with conduit 46 and accumulator stage 48. Conduit 46 is a heatable tubing having a first end operably connected to or integrally formed with outlet end 80 of liquefier 68, and a second end operably connected to or integrally formed with accumulator stage 48. This allows the pressurized molten material to flow through conduit 46 between stages 44 and 48. In some embodiments, conduit 46 is a tubular conduit (e.g., hollow cylindrical, elliptical, rectangular, etc . . . ) that is fabricated from a thermally and electrically conductive material (e.g., stainless steel). Conduit 46 is also preferably long and thin enough such that accumulator stage 48 can move relative to liquefier stage 44, at least over small distances, without excessive biasing resistance.

Suitable lengths for conduit 46 may vary depending on the particular mounted locations of stages 44 and 48. Examples of suitable lengths for conduit 46 between stages 44 and 48 range from about 51 millimeters (about 2 inches) to about 1 meter (about 40 inches), and in some preferred embodiments range from about 150 millimeters (about 6 inches) to about 380 millimeters (about 15 inches). In embodiments in which conduit 46 is cylindrical, examples of suitable outer diameters for conduit 178 range from about 0.635 millimeters (about 0.025 inches) to about 6.4 millimeters (about 0.25 inches), and in some preferred embodiments range from about 1.37 millimeters (about 0.054 inches) to about 3.0 millimeters (about 0.12 inches). Similarly, examples of suitable hollow inner diameters for conduit 46 range from about 0.58 millimeters (about 0.023 inches) to about 6.6 millimeters (about 0.26 inches), and in some preferred embodiments range from about 1.3 millimeters (about 0.05 inches) to about 3.2 millimeters (about 0.125 inches). In embodiments in which conduit 46 is not cylindrical, suitable outer and hollow inner cross-sectional areas include those corresponding to the above discussed outer and hollow inner diameters.

Conduit 46 is preferably heated and/or thermally insulated to prevent the molten material from solidifying during printing operations. For instance, conduit 46 may include one or more thermally and/or electrically insulating casings that enshroud a thermally and electrically conductive hollow tube core. In the above-discussed embodiment in which conduit 46 is thermally and electrically conductive, a electrical current may be applied to conduit 46 (e.g., via line 36) to generate resistive heating along conduit 46. Controller assembly 34 may also measure and monitor the temperature of conduit 46 in real time from the resistance to the applied electrical current (e.g., via line 36). This provides a unique low-mass solution for keeping the molten material heated as it is pushed through conduit 46 to accumulator stage 48. In alternative embodiments, conduit 46 may be fabricated from a high-temperature polymeric material and encased in a heating sleeve or coil.

For fine positioner 42, miniactuator 56 is an example robotic mechanism that includes a pair of rotary voice coil actuators 84 mounted with a 90-degree separation arrangement, where each voice coil actuator 84 is connected to a set of linkage arms 86 that collectively support and move effector 58 (and accumulator stage 48) in the x-y plane (and optionally along the z-axis). This arrangement of linkage arms 86 effectively maintains the same center-of-mass for effector 58 (and accumulator stage 48) to pivot around. Additionally, as discussed above, coarse positioner 40 may also include other components, such as torque compensator 59, for assisting the operation of miniactuator 56. Based on the torque and angular stroke achievable with each voice coil actuator 84 and the dimensions of linkage arms 86, microactuator 56 is capable of pushing a small payload with a motion range up to about one-square inch for effector 58 and accumulator stage 48.

For instance, if each voice coil actuator 84 is capable of generating a peak torque of about 120 ounce-force inches to rotate or pivot linkage arms 86 around their common center, and if the radius of each arm is about 1.6 inches, the static force on the face each linkage arm 86 adjacent to effector 58 is about 4.7 pounds-force. In this case, microactuator 56 is capable of pushing a payload of about 2.2 pounds-force. In order to achieve accelerations and decelerations of about 50 gees, this results in a payload limit of about 20 grams. As briefly discussed above, this requires effector 58 and accumulator stage 48 to be low mass.

As mentioned above, in embodiments in which liquefier assembly 20 is a single-stage liquefier assembly, downstream accumulator stage 48 may be replaced with an extrusion nozzle. In this case, conduit 46 may extend into effector 58 and terminate at an extrusion nozzle (e.g., corresponding to nozzle 90, discussed below). Controller assembly 34 may accordingly operate the single-stage liquefier assembly 20 with a drive control determined by liquefier stage 44.

Fine positioner 42 having microactuator 56 is an example of a suitable fine positioner for use with print assembly 20. However, print assembly 20 may alternatively incorporate a variety of fine positioners, such as one or more other microactuators, flexure-based piezoelectric stacks, hexapods, Stuart platforms, voice-coil mechanisms, hydraulic-based actuators, and the like. In fact, in some embodiments, fine positioner 42 may move effector 58 and accumulator stage 48 (or an extrusion nozzle) with multiple degrees of movement, such as in an x-y-z range, polar-coordinate movements, rotational movements in the x-y plane, and the like.

Figure 6:
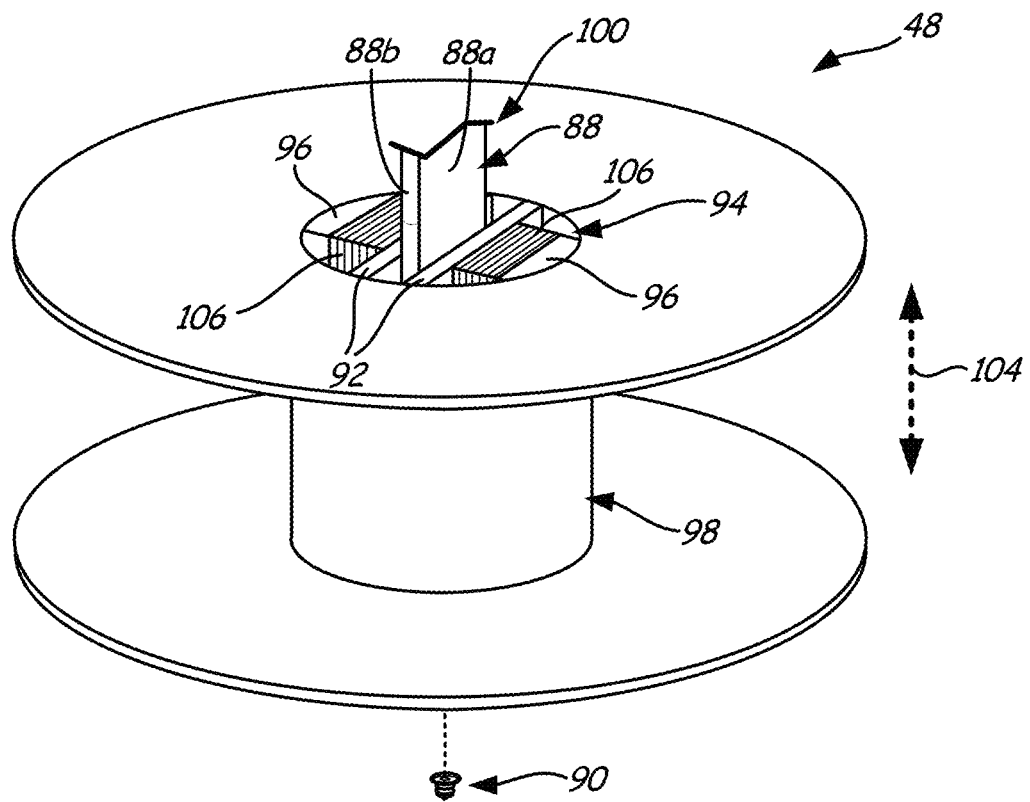
FIG. 6 is a top perspective view of the accumulator stage.
Figure 7:
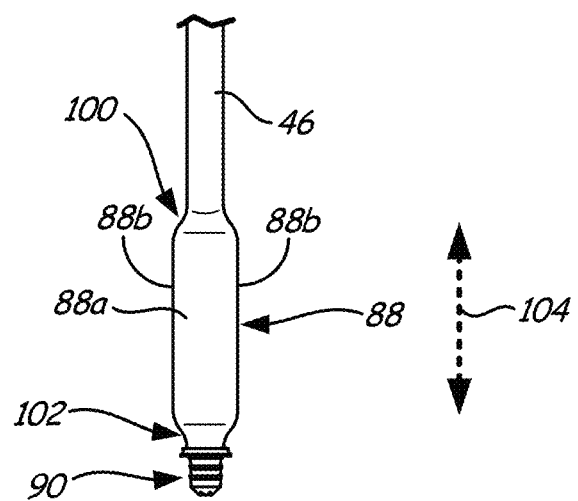
FIG. 7 is a front view of an accumulator of the accumulator stage integrally formed with the conduit, and secured to a nozzle.
Figure 8:
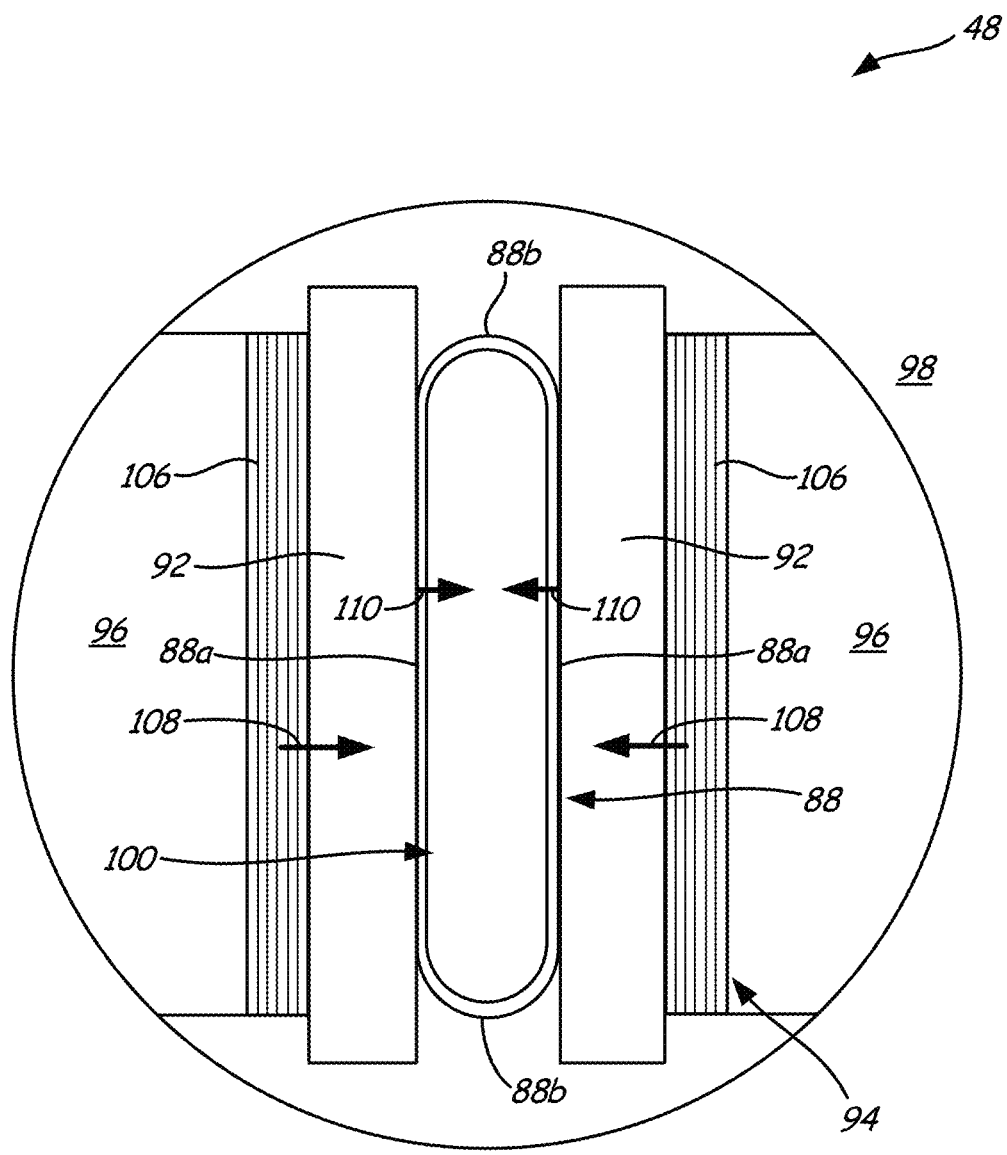
FIG. 8 is an inlet end view of the accumulator stage.

FIGS. 6-8 illustrate an examplary design for accumulator stage 48, which includes accumulator 88, nozzle 90, spacers 92, actuator mechanism 94, spacers 96, and heat sink 98. Accumulator 88 is a transversely compressible and expandable liquefier, which includes opposing faces 88a and opposing lateral ends 88b, where faces 88a are the larger dimensions of accumulator 88 (corresponding to the width of accumulator 88) and lateral ends 88b are the smaller dimensions of accumulator 88 (corresponding to the thickness of accumulator 88). As with liquefier 68, accumulator 88 is also preferably fabricated from one or more rigid, thermally-conductive materials, such as stainless steel, and preferably has a ribbon-liquefier geometry (i.e., a hollow liquefier having a substantially rectangular, arcuate, and/or an elliptical inner-channel cross-section along its longitudinal length).

Accumulator 88 also has an inlet end 100 and an outlet end 102 (shown in FIG. 7), which are preferably offset from each other along longitudinal axis 104. Inlet end 100 is secured to or integrally formed with conduit 46 to receive the molten material from conduit 46. Outlet end 102 is the downstream portion of accumulator 88 and terminates in nozzle 90. Accumulator 88 may have a length along longitudinal axis 104 ranging from about 5 millimeters (about 0.2 inches) to about 25 millimeters (about 1 inch), more preferably from about 8 millimeters (about 0.3 inches) to about 18 millimeters (about 0.7 inches). Accumulator stage 48 itself may also have these range of lengths.

Suitable hollow, inner-channel thicknesses between faces 88a range from about 0.25 millimeters (about 10 mils) to about 2.5 millimeters (about 100 mils), and in some embodiments from about 0.76 millimeters (about 30 mils) to about 1.3 millimeters (about 50 mils). Suitable hollow, inner-channel widths between lateral ends 88b (perpendicular to the inner-channel widths) range from about 2.5 millimeters (about 100 mils) to about 10.2 millimeters (about 400 mils), in some embodiments from about 5.1 millimeters (about 200 mils) to about 7.6 millimeters (about 300 mils), and in some further embodiments from about 5.7 millimeters (about 225 mils) to about 7.0 millimeters (about 275 mils). Suitable wall thicknesses for accumulator 88 range from about 130 micrometers (about 5 mils) to about 500 micrometers (about 20 mils). The above-discussed widths and thicknesses for accumulator 88 are based on the maximum extents of the widths and thicknesses.

Furthermore, accumulator 88 preferably has wall thicknesses, at least at faces 88a, such that when fabricated from one or more polycrystalline metals, the transverse compression and expansion on faces 88a preferably generate less than about 0.3% strain. In embodiments in which accumulator 88 is fabricated from one or more amorphous metals and/or polymers, the transverse compression and expansion on faces 88a preferably generate less than about 3% strain.

Nozzle 90 is a small-diameter nozzle at outlet end 102 of liquefier 88, and is configured to extrude the molten material at a desired road width. Preferred inner tip diameters for nozzle 90 include diameters up to about 760 micrometers (about 0.030 inches), and more preferably range from about 125 micrometers (about 0.005 inches) to about 510 micrometers (about 0.020 inches). In some embodiments, nozzle 90 may include one or more recessed grooves between annular rings to produce roads having different road widths, as discussed in Swanson et al., U.S. Publication No. 2014/0048969. In other embodiments, nozzle 90 may have larger inner tip diameters, such as for large extrudate embodiments.

Nozzle 90 may also have an axial channel with any suitable length-to-diameter ratio. For example, in some embodiments, nozzle 90 may have an axial channel with a length-to-diameter ratio to generate high flow resistance, such as a ratio of about 2:1 to about 5:1. In other embodiments, nozzle 90 may have an axial channel with a length-to-diameter ratio to generate lower flow resistance, such as a ratio less than about 1:1. Accordingly, suitable length-to-diameter ratios for the axial channel of nozzle 90 may range from about 1:2 to about 5:1, where in some low-flow resistance embodiments, ratios ranging from about 1:2 to about 1:1 may be preferred.

As can be appreciated, when printing 3D part 12 or support structure 14, the extrudate flow from nozzle 90 is rarely held at a constant, steady-state rate. Instead, the extrudate flow rate is typically being changed repeatedly to accommodate a variety of different tool path conditions, such as road start accelerations, road stop decelerations, cornering decelerations and accelerations, road width variations, and the like.

These flow rate changes are traditionally controlled by adjusting the feed rate of filament 60 into a liquefier (e.g., liquefier 68 with drive mechanism 62), based on commands from controller assembly 34. This correspondingly adjusts the pressure generated by the viscosity-pump action on the molten material. However, when controller assembly 34 commands drive mechanism 62 to change the feed rate of filament 60 into liquefier 68 (to change the extrudate flow rate from nozzle 90 of accumulator stage 48), there is a time response delay between the signal command and when the extrusion rate from nozzle 90 actually changes. This is due to response limitations in the motor of drive mechanism 62, the viscosity-pump action in liquefier 68, and the distance between stages 44 and 48.

Liquefier assembly 20 may supplement this slower-responding, viscosity-pump action with compressions and expansions of accumulator 88. It has been found that liquefiers with particular cross-sectional geometries, such as ribbon liquefiers (e.g., accumulator 88), are susceptible to transversely-applied pressures, and can compress inwardly and expand outwardly at faces 88a. For instance, it has been found that accumulator 88 (and liquefier 68) can expand or balloon transversely outward at faces 88a due to internal pressures that are generated during printing operations. These internal pressures are typically generated by the viscosity-pump action of the fed filament 60, and the thermal expansion of the filament material upon melting.

Controller assembly 34 can utilize the compressibility of accumulator 88 in a unique manner to generate fast surges of the extrudate from nozzle 90 when compressing accumulator 88, and rapid draw backs of the extrudate flow upward from nozzle 90 when accumulator 88 is allowed to expand. These fast-responding operations can supplement the slower-responding flow rate changes from the viscosity-pump action to improve extrudate flow accuracies during non-steady-state conditions.

In particular, controller assembly 34 can command actuator mechanism 94 to compress and release accumulator 88. In the embodiment shown in FIGS. 6-8, actuator mechanism 94 includes two (or more) opposing piezoelectric actuators 106, which are example actuators for quickly generating transverse compressions on accumulator 88. As shown, each piezoelectric actuator 106 has a piezoelectric-stack configuration that is secured between spacers 92 and 96, and is configured to extend and contract based on the application of electrical power, such as from line 36. Controller assembly 34 preferably sets a baseline contraction setting for each piezoelectric actuator 106 at an intermediate state or mid-position between full expansion and full contraction. This allows each piezoelectric actuator 106 to both contract and extend as needed. Actuator mechanism 94 also preferably includes one or more displacement sensors (e.g., capacitive sensors, not shown) that monitor and/or correct displacement errors in piezoelectric actuators 106, which may be due to hysteresis, thermal effects, and the like. As such, the baseline contraction settings for piezoelectric actuators 106 may optionally be updated to account for these displacement errors.

Due to the close proximity of piezoelectric actuators 106 to accumulator 88, spacers 92 and 96 preferably thermally isolate piezoelectric actuators 106 from accumulator 88 to protect piezoelectric actuators 106 from exposure to excessive heat. In particular, spacers 92 and 96 are preferably in contact with heat sink 98 to draw heat away from accumulator stage 48. Heat sink 98 may have any suitable design, and may function by active and/or passive cooling. For instance, heat sink 98 may include multiple fins to dissipate heat from accumulator stage 48, and system 10 may also include one or more cooling fans to generate an air flow around heat sink 98 to increase the heat removal. The heat dissipation from heat sink 98 can also provide a more rapid cool down of accumulator 88 when accumulator stage 48 is shut down or placed in a stand-by state.

Accumulator stage 48 may also optionally include one or more heater assemblies (not shown) corresponding to heater assemblies 70. However, as shown in FIG. 7, in one embodiment, accumulator 88 may be a downstream end of conduit 46 that is crushed or otherwise shaped into a ribbon-liquefier geometry (e.g., rectangular, elliptical, or arcuate). In this case, heater assemblies 70 may be omitted, particularly if conduit 46 is thermally and electrically conductive, and is heated by an applied electrical voltage. Nozzle 90 may also be secured to outlet end 102 of accumulator 88, as shown.

During the printing operation, controller assembly 34 may command piezoelectric actuators 106 in a synchronized manner such that piezoelectric actuators 106 both extend to apply compressive pressures on accumulator 88 (for generating a surge of the molten material), or both contract to release the transversely-applied pressure from accumulator 88 (for generating a drawback of the molten material).

Controller assembly 34 may also command the piezoelectric actuators 106 in a variety of different manners, such for providing high-precision movements of nozzle 90 along the x-axis. In this case, controller assembly 34 may command one of piezoelectric actuators 106 to extend, and command the other piezoelectric actuator 106 to contract. This moves accumulator 88 and nozzle 90 relative to effector 58 along the x-axis, which can supplement any fine-coarse positioning of positioners 40 and 42.

For example, as shown in FIG. 8, when controller assembly 34 commands piezoelectric actuators 106 to extend, as depicted by arrows 108, this squeezes accumulator 88 and spacers 92 between spacers 96 and heat sink 98. Because spacers 92 and 96 are relatively incompressible compared to accumulator 88, the transversely-applied pressure quickly compresses faces 88a of accumulator 88 together, as depicted by arrows 110, which rapidly reduces the internal volume of accumulator 88 relative to its initial cross section. Because the molten material in accumulator 88 is also relatively incompressible (but squishable or flowable), the quick compression of accumulator 88 results in a surge or rapid jetting of the molten material from nozzle 90.

Piezoelectric actuators 106 are particularly suitable actuator for compressing and releasing accumulator 88 in this controlled manner due to its ability to generate high compressive loads at very fast frequencies. However, this is only achievable because accumulator 88 itself can compress in response to the compressive loads. Piezoelectric actuators 106 preferably compress accumulator 88 along its entire length, or at least a substantial portion of its entire length. This allows a large internal volume of accumulator 88 to be compressed relative to its surface area, which remains substantially unchanged, thereby allowing a relatively large volume of the molten material to be rapidly extruded from nozzle 90 in the surge, if desired.

Additionally, when controller assembly 34 commands piezoelectric actuators 106 to contract, this reduces the transverse pressure applied to accumulator 88, allowing accumulator 88 to expand back outward, such as back to its original state (e.g., based on the baseline contraction setting of piezoelectric actuators 106), or to a fully expanded state (e.g., for extrudate draw back).

As can be appreciated, the compressions applied to accumulator 88 by actuator mechanism 94 are transversely-applied pressures that are external to accumulator 88, and are applied to the outer surface of accumulator 88 (e.g., at faces 88a). This is in comparison to internal pressures that are generated by the viscosity-pump action of filament 60 or by thermal expansions of the filament material upon melting, or any other pressures that otherwise affect accumulator 88 from the inside or interior region of accumulator 88.

Figure 9:
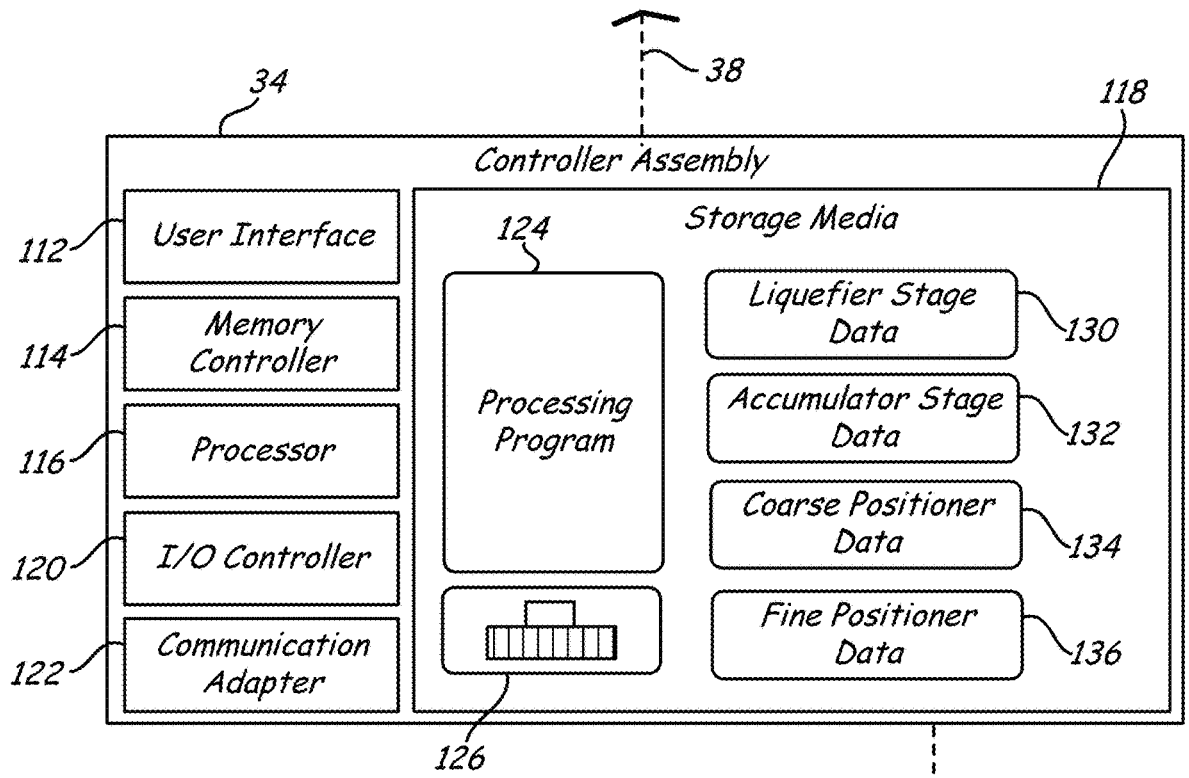
FIG. 9 is a schematic illustration of a controller assembly of the additive manufacturing system in use with the print assembly.
Figure 9:
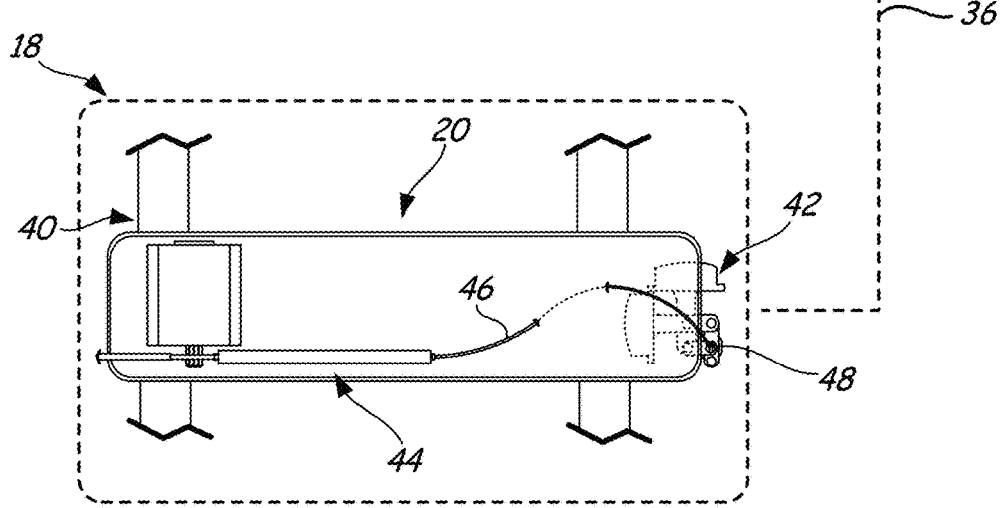

FIG. 9 illustrates an example architecture for controller assembly 34 in use with print assembly 18. Controller assembly 34 may include any suitable computer-based hardware, such as user interface 112, memory controller 114, processor 116, storage media 118, input/output (I/O) controller 120, and communication adapter 122. Controller assembly 34 may also include a variety of additional components that are contained in conventional computers, servers, media devices, signal processing devices, and/or printer controllers.

User interface 112 is a user-operated interface (e.g., keyboards, touch pads, touch-screen displays, display monitors, and other eye, voice, movement, or hand-operated controls) configured to operate controller assembly 34. Memory controller 114 is a circuit assembly that interfaces the components of controller assembly 34 with one or more volatile random access memory (RAM) modules of storage media 118. Processor 116 is one or more computer-processing units configured to operate controller assembly 34, optionally with memory controller 114, and preferably with related processing circuitry (e.g., programmable gate arrays, digital and analog components, and the like). For instance, processor 116 may include one or more microprocessor-based and/or microcontroller-based units, one or more central processing units, and/or one or more front-end processing units.

Storage media 118 is one or more internal and/or external data storage devices or computer storage media for controller assembly 34, such as volatile RAM modules, read-only memory modules, optical media, magnetic media (e.g., hard disc drives), solid-state media (e.g., FLASH memory and solid-state drives), analog media, and the like. Storage media 118 may retain an executable copy of processing program 124, and may retain one or more digital models to be printed with system 10, such as digital model 126. Controller assembly 34 may receive digital model 126 over communication line 38, where digital model 126 may have any suitable file format, such as an STL file format, an AMF file format, and the like.

Processing program 124 is one or more pre-processing and/or post-processing programs for optionally orienting digital model 126, slicing the oriented digital model 126 into layers, generating support structures, generating tool path instructions for printing each sliced layer with system 10, and the like. I/O controller 120 is a circuit assembly that interfaces memory controller 114, processor 116, and storage media 118 with various input and output components of controller assembly 34, including user interface 112 and communication adapter 122. Communication adapter 122 is one or more wired or wireless transmitter/receiver adapters configured to communicate over communication lines 36 and 38.

The commands from controller assembly 34 to the components of system 10 and print assembly 18, such as drive mechanism 62, heater assemblies 70, and actuator mechanism 94, are performed with one or more of user interface 112, memory controller 114, processor 116, storage media 118, input/output (I/O) controller 120, communication adapter 122, processing program 124, and/or other suitable hardware and software implementations, as is understood by those skilled in the art.

Controller assembly 34 can use the compressible nature of accumulator 88 in a variety of manners to change the extrudate flow rates from liquefier assembly 20. For instance, controller assembly 34 can generate low and high pass signals in a crossover manner for commanding drive mechanism 62 (time-varying, low pass signals) and actuator mechanism 94 (time-varying, high pass signals), and store them on storage media 118 as one or more data files 130 and 132.

Controller assembly 34 may also generate low and high pass signals in a crossover manner for commanding coarse positioner 40 and fine positioner 42, and store them on storage media 118 as one or more data files 134 and 136. This allows controller assembly 34 to use the faster accelerations and decelerations of fine positioner 42 to supplement the slower accelerations and decelerations of coarse positioner 40, as mentioned above. Controller assembly 34 may then use these data files 130-136 with processing program 126 to generate the tool path instructions for printing each sliced layer with system 10.

Figure 10:
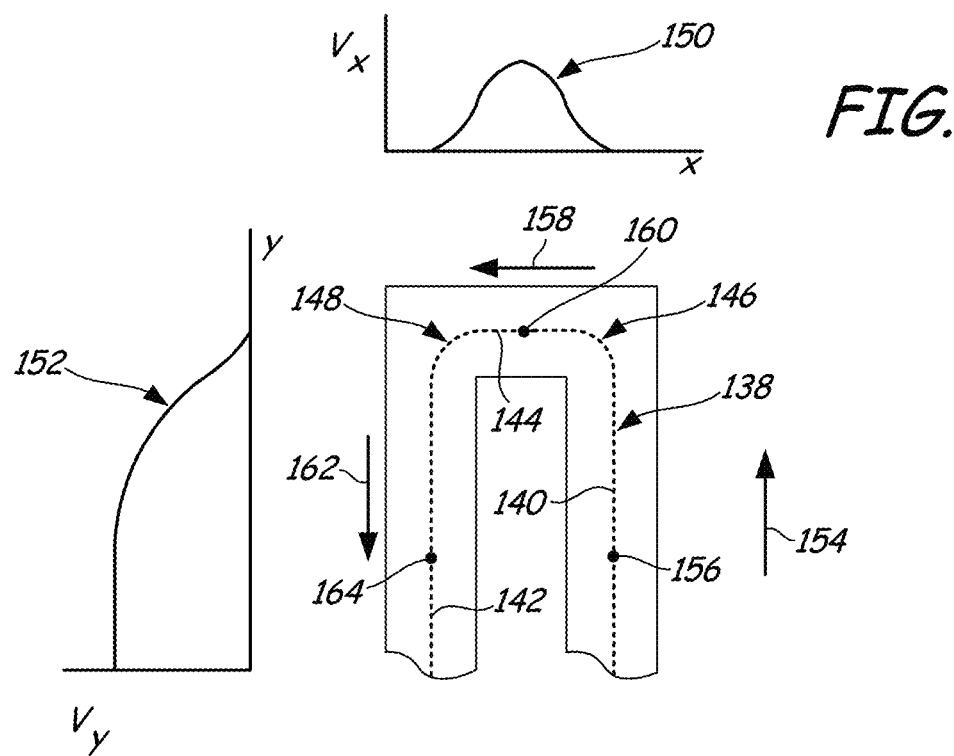
FIG. 10 is a graphical illustration of a tool path segment having sharp, 180-degree turn.
Figure 11:
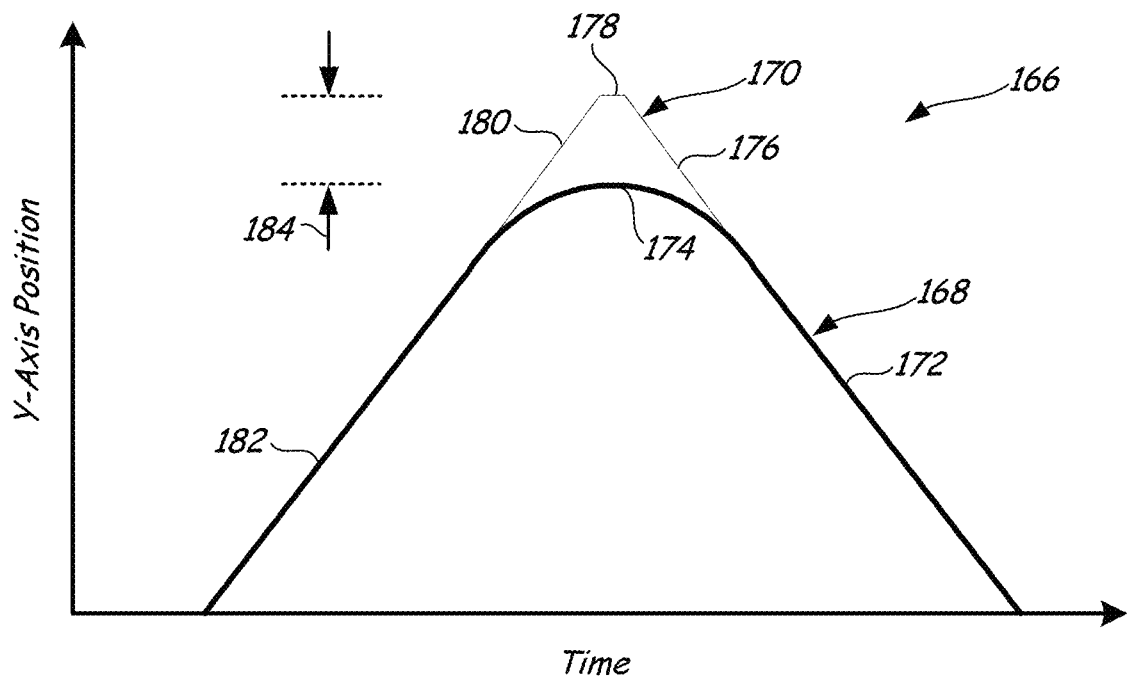
FIG. 11 is a graphical illustration of y-axis positions for the coarse positioner and the fine positioner while traversing the tool path segment shown in FIG. 10.
Figure 12:
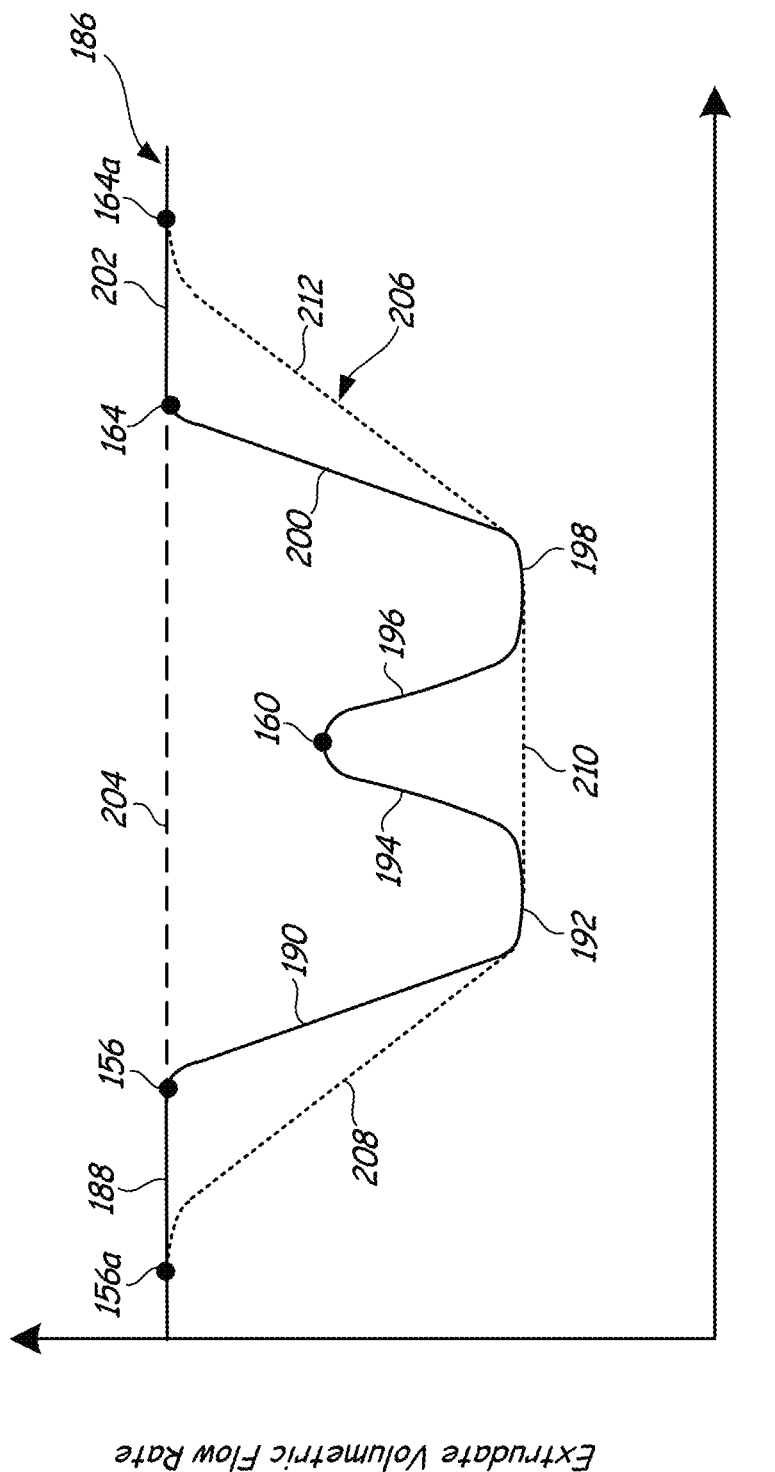
FIG. 12 is a graphical illustration of extrudate volumetric flow rates while traversing the tool path segment shown in FIG. 10.

FIGS. 10-12 illustrates an example application for print assembly 18, where FIG. 10 depicts tool path segment 138 following a classic tortuous raster path arrangement, where tool path segment 138 has parallel straight pathways 140 and 142 connected by a short, 180-degree turn-around pathway 144. This tool path arrangement produces two corners 146 and 148. During the printing operation, controller assembly 34 commands coarse positioner 40 to move nozzle 90 of accumulator stage 48 along tool path segment 138, while also commanding liquefier assembly 20 to extrude the part or support material to print a road that follows tool path segment 138.

FIG. 10 also illustrates x-axis velocity plot 150 and y-axis velocity plot 152, which are respective graphical plots of the x-axis velocity and the y-axis velocity for nozzle 90 as it moves along tool path segment 138. For a perspective of scale, the length of turn-around pathway 144 can be about 20 mils.

As nozzle 90 is moved along pathway 140 in the direction of arrow 154 towards corner 146, positioners 40 and 42 may maintain a fast nozzle velocity (e.g., about 30 inches/second) due to the linear pathway. However, at a given point along pathway 140 (e.g., point 156), controller assembly 34 commands positioners 40 and 42 to decelerate nozzle 90 from the fast nozzle velocity to a slower nozzle velocity (e.g., about 10 inches/second) before reaching corner 146. This is illustrated by a velocity reduction in y-axis velocity plot 152. Positioners 40 and 42 may then negotiate corner 146, and proceed along pathway 144 in the direction of arrow 158. While passing around corner 146, positioners 40 and 42 can briefly accelerate nozzle 90 along the x-axis as shown by x-axis velocity plot 150.

At about a midpoint 160 of pathway 144, while approaching the second corner 148, controller assembly 34 commands positioners 40 and 42 to decelerate nozzle 90 along the x-axis, as also shown by x-axis velocity plot 150. Positioners 40 and 42 may then negotiate corner 148, and proceed along pathway 142 in the direction of arrow 162. Controller assembly 34 may then command positioners 40 and 42 to accelerate nozzle 90 back up to the fast nozzle velocity (e.g., about 30 inches/second) upon reaching a point along pathway 142 (e.g., point 164).

FIG. 11 illustrates y-axis position plot 166, which includes signal component 168 for coarse positioner 40, and signal component 170 for fine positioner 42. As positioners 40 and 42 move nozzle 90 along pathway 140 toward corner 146, the linear motion can be performed entirely by coarse positioner 40, as illustrated by plot segment 172 of signal component 168. Thus, controller assembly 34 may command fine position 42 to remain in a neutral position, and not move accumulator stage 48 relative to coarse positioner 40.

When negotiating corner 146, pathway 144, and corner 148, controller assembly 34 may command coarse positioner 40 to decelerate and accelerate at rates that are low enough such that its natural gantry resonances are not significantly excited, thereby avoiding inducing x-y position errors. This results in plot segment 174 of signal component 168, which itself does not directly follow the x-y coordinates of tool path 138 at corner 146, pathway 144, and corner 148. Instead, controller assembly 34 commands fine positioner 42 to move nozzle 90 along the x-y coordinates of tool path 138, as illustrated by plot segments 176, 178, and 180 of signal component 170, where fine positioner 42 also decelerates and accelerates at rates that do not significantly excite its natural gantry resonances.

After passing corner 148, controller assembly 34 may command fine positioner 42 to return to its neutral position when coarse positioner 40 reaches the desired x-y coordinates of tool path 138 along pathway 142, as illustrated by plot segment 182 of signal component 168. Thus, plot 168 depicts a scenario where finer positioner 42 supplements the movements of coarse positioner 40. The difference 184 between the maximum y-positions of coarse positioner 40 and fine positioner 42 is preferably within the range of motion achievable by fine positioner 42 along the y-axis (e.g., within about one inch).

As can be appreciated, head gantries having low fundamental resonance frequencies require longer durations to decelerate nozzle 90 from point 156 to corner 146, and to accelerate nozzle 90 from corner 148 to point 164. In effect, lower fundamental resonance frequencies move the locations of points 156 and 164 further away along pathways 140 and 142 from corners 146 and 148 due to the slower decelerations and accelerations.

While the effects of the slower decelerations and accelerations may not be readily apparent by the placements of points 156 and 164 in FIG. 10, as shown in FIG. 12, liquefier assembly 20 also preferably reduces the extrudate volumetric flow rate from nozzle 90 when nozzle 90 moves at slower velocities, as illustrated by flow rate plot 186. This is preferred to maintain accurate deposition volumes.

As can be seen in FIG. 12, as positioners 40 and 42 move nozzle 90 along pathway 140 in the direction of arrow 154 prior to reaching point 156, liquefier assembly 20 can extrude the part or support material from nozzle 90 at a high flow rate, as illustrated by plot segment 188. However, upon reaching point 156 and decelerating from the fast nozzle velocity to the slower nozzle velocity while approaching corner 146, liquefier assembly 20 also reduces the volumetric flow rate from nozzle 90 from the high flow rate to a lower flow rate (e.g., about one-third of the high flow rate). This is illustrated by plot segment 190, and maintains the same deposited volume for the extrudate road.

While negotiating corner 146, nozzle 90 is moved at its slowest rate. Accordingly, controller assembly 34 may command liquefier assembly 20 to hold the low volumetric flow rate from nozzle 90, as illustrated by plot segment 192, to match the slower velocity of nozzle 90 at its passes around corner 146. Then, after passing corner 146, controller assembly 34 may command liquefier assembly 20 to increase the volumetric flow rate from nozzle 90, as illustrated by plot segment 194, to match the increasing velocity of nozzle 90 along the x-axis.

Upon reaching midpoint 160, the above-discussed pattern is reversed, as illustrated by plot segments 196, 198, 200, and 202. The resulting profile of plot 186 illustrates the reduced volume of extrudate when negotiating tool path 138 compared to the volume extruded if nozzle 90 traveled along a straight tool path at the high velocity and high extrudate flow rate (illustrated by line 204). For example, if the high extrudate flow rate from nozzle 90 (at plot segments 188 and 202) is about 10,000 micro-cubic inches/second (mics/s) and the low extrudate flow rate from nozzle 90 (at plot segments 192 and 198) is about one-third of this (e.g., about 3,333 mics/s), this produces an extrudate volume reduction of about 30 mics for this turn-around alone.

In comparison, as shown by plot 206 in FIG. 12 (illustrated with broken lines), for a single-stage gantry having a low resonance frequency corresponding to coarse positioner 40, the slower deceleration of the gantry requires liquefier assembly 20 to begin reducing the volumetric flow rate from nozzle 90 from the high flow rate to the lower flow rate at point 156a. This is illustrated by plot segment 208.

Then, between corners 146 and 148, the low volumetric flow rate from nozzle 90 is held, as illustrated by plot segment 210, to match the slower velocity of nozzle 90. Then, after passing corner 146, the volumetric flow rate from nozzle 90 may be increased, as illustrated by plot segment 212, to match the increasing velocity of nozzle 90. However, the slower acceleration of the gantry requires liquefier assembly 20 to increase the volumetric flow rate from nozzle 90 at a slower rate to maintain accurate deposition volumes. As such, as illustrated by plot segment 212, the volumetric flow rate from nozzle 90 does not reach the high flow rate to the high flow rate at point 164a.

The resulting profile of plot 206 illustrates the reduced volume of extrudate when negotiating tool path 138 compared to the volume extruded if nozzle 90 traveled along a straight tool path at the high velocity and high extrudate flow rate (illustrated by line 204). Following the same example discussed above, if the high extrudate flow rate from nozzle 90 is about 10,000 mics/s and the low extrudate flow rate from nozzle 90 is about one-third of this (e.g., about 3,333 mics/s), this produces an extrudate volume reduction of several hundred mics for this turn-around alone.

As can be seen by comparing the extrudate volume reductions between plots 186 and 206, the use of the coarse-fine positioning with positioners 40 and 42 can result in a significant increase in overall printing speeds. This is particularly true if tool path 138 is one of many tortuous tool paths required to print 3D part 12 (e.g., hundreds or thousands of tortuous tool paths). This can cumulatively result in significant increases in overall printing speeds, while maintaining accurate depositions.

Additionally, the higher-frequency movements of fine positioner 42 can also be used to clean the tip of nozzle 90. For example, a fast lateral flick with an acceleration of about 50 gees can readily break any extrudate stringing and oozing that may otherwise occur after completing a tool path deposition. This can optionally preclude the need for a separate purge operation.

Moreover, high-frequency oscillations of effector 58 and accumulator stage 48 in directions that are normal to the direction of movement can also cause nozzle 90 to function as a larger nozzle. For instance, if coarse positioner 40 and/or fine positioner 42 are moving accumulator stage 48 along the x-axis, fine positioner 42 may also oscillate accumulator stage 48 back-and-forth along the y-axis at a high frequency to effectively increase the deposition range of nozzle 90 along the y-axis (i.e., increase the effective size of nozzle 90).

Figure 13:
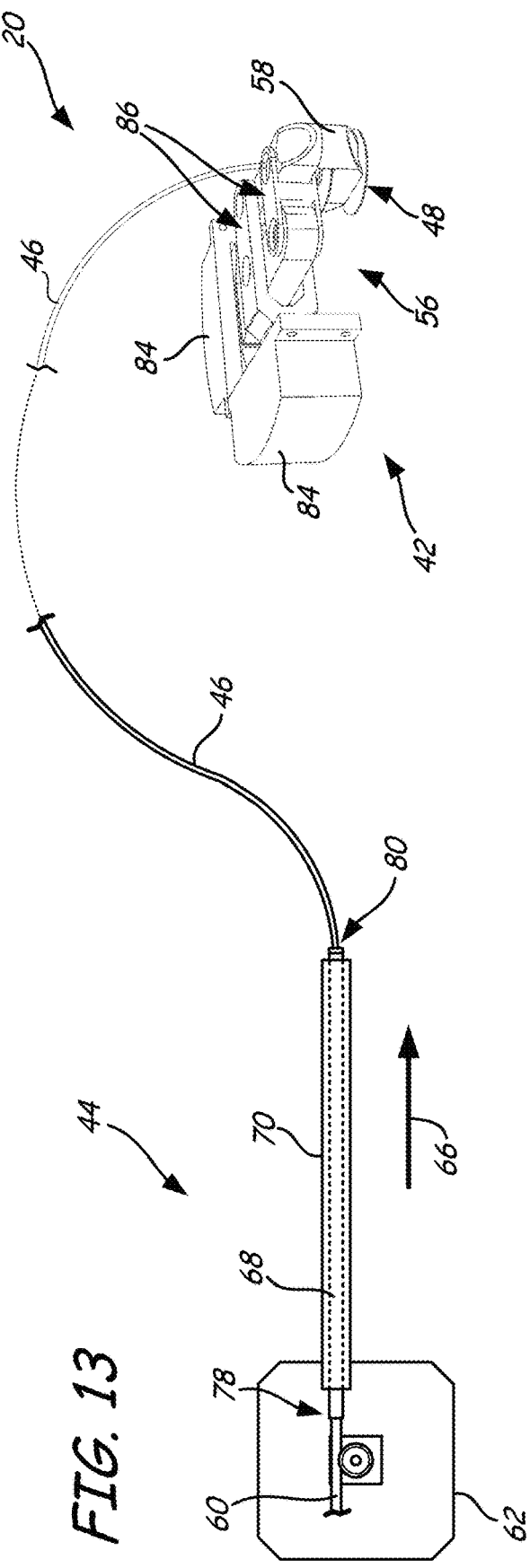
FIG. 13 is a perspective view of an alternative liquefier assembly, in which the upstream liquefier stage includes a cylindrical liquefier.
Figure 14:
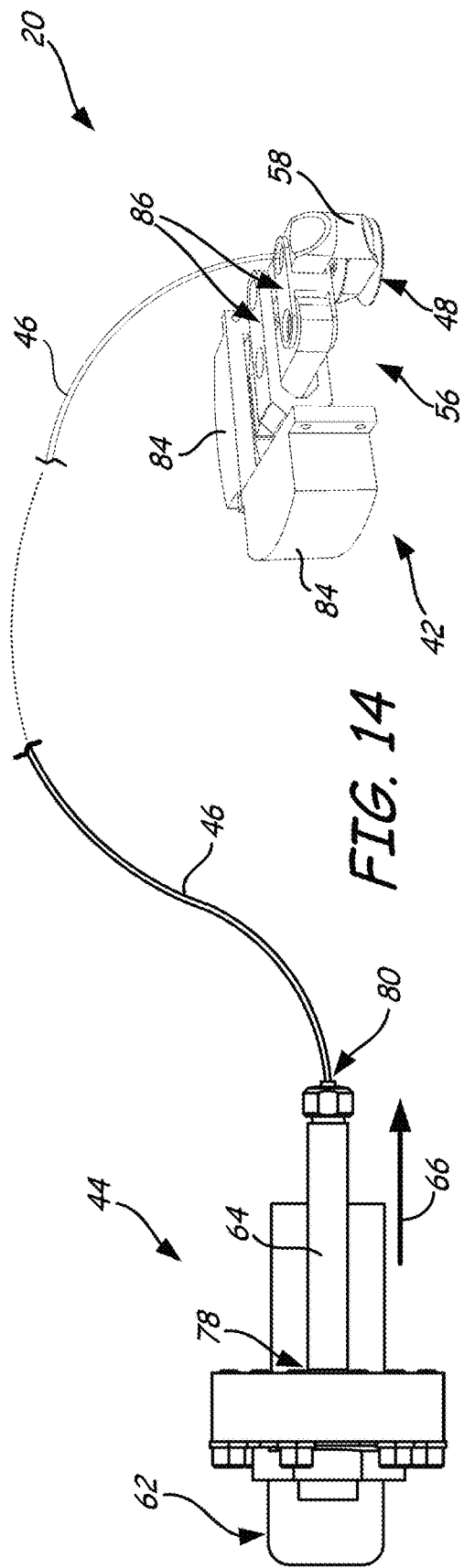
FIG. 14 is a perspective view of another alternative liquefier assembly, in which the upstream liquefier stage includes a screw pump.
Figure 15:
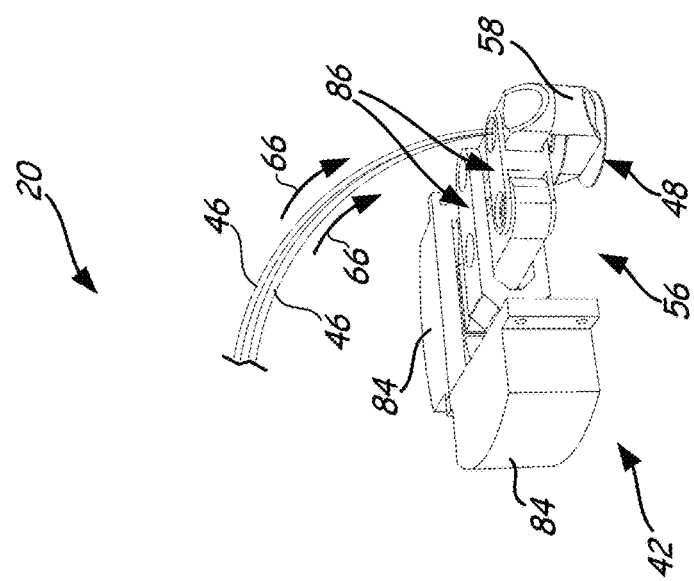
FIG. 15 is a perspective view of another alternative liquefier assembly, in which multiple upstream liquefier stages are used with a common downstream accumulator stage.
Figure 15:
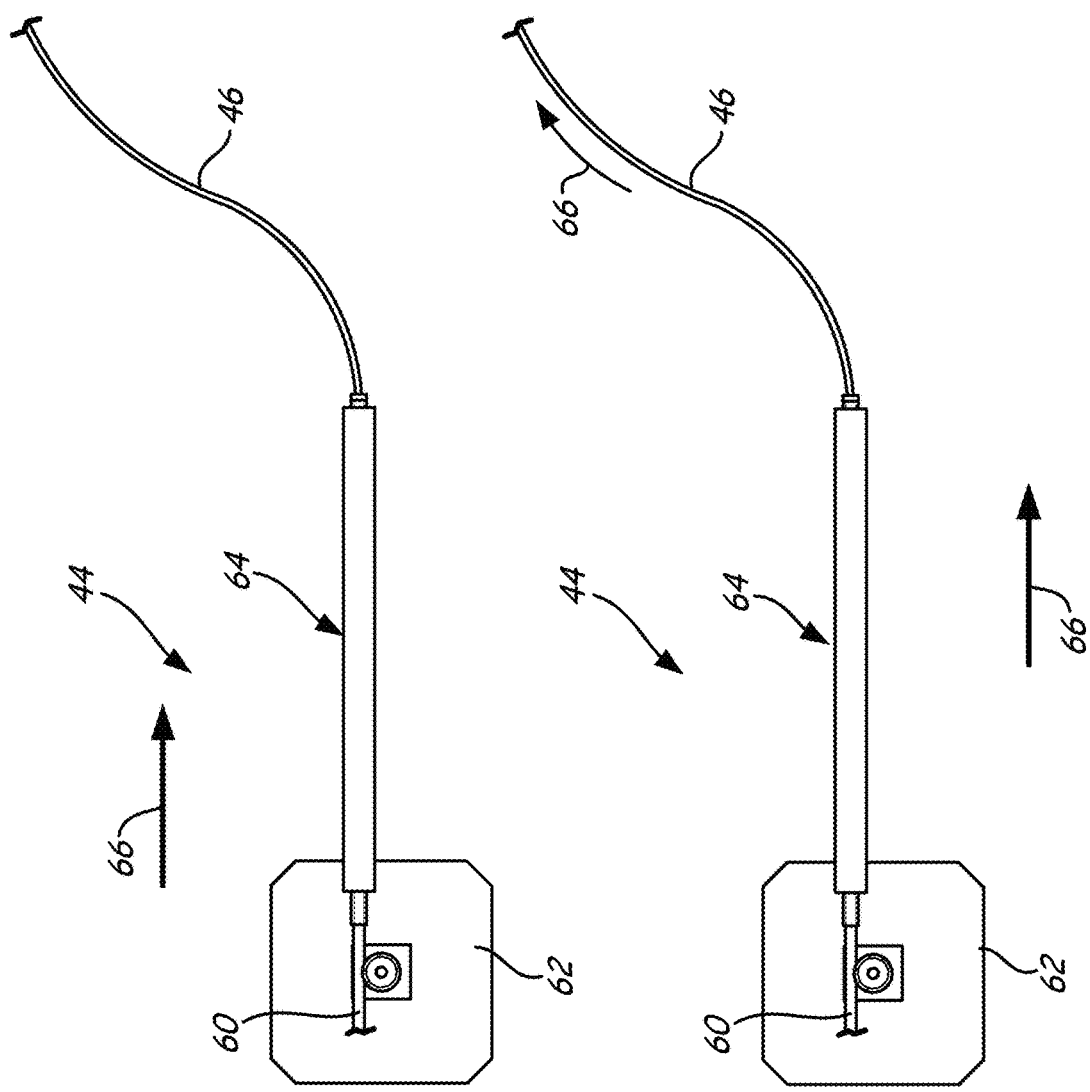

While discussed above as having a ribbon architecture, liquefier stage 44 may alternatively include alternative designs, as illustrated in FIGS. 13-15. For example, as shown in FIG. 13, liquefier stage 44 may include a cylindrical liquefier 68 at least partially encased by heater assembly 70, and which is in use with cylindrical filament 60. Cylindrical liquefier 68 in this embodiment may have any suitable dimensions for melting the cylindrical filament 60, and for pushing the pressurized molten material to conduit 46, as discussed above.

Examples of suitable lengths for cylindrical liquefier 68 in this embodiment include at least about 1.5 inches, more preferably from about 1.5 inches to about 5 inches, and even more preferably from about 50 millimeters (about 2 inches) to 76 millimeters (about 3.0 inches). Examples of suitable hollow inner diameters for cylindrical liquefier 68 range from about 1.5 millimeters (about 60 mils) to about 2.5 millimeters (about 100 mils), and in some embodiments from about 2 millimeters (about 80 mils) to about 2.4 millimeters (about 95 mils). In other embodiments, the hollow inner diameters range from about 1.5 millimeters (60 mils) to about 2 millimeters (about 80 mils). Examples of suitable wall thickness for cylindrical liquefier 68 range from about 0.25 millimeters (about 10 mils) to about 0.76 millimeters (about 30 mils), and more preferably from about 0.38 millimeters (about 15 mils) to about 0.5 millimeters (about 20 mils).

As shown in FIG. 14, drive mechanism 62 has a screw-pump design with an internal impeller (not shown) for feeding and melting a consumable material in liquefier stage 44. In this embodiment, the consumable material may be provided as any suitable media, such as a filament, powder, pellets, or the like, as discussed above. As mentioned above, examples of suitable screw pumps for driving or feeding filaments include those discussed in Skubic et al., U.S. Pat. No. 7,891,964. Examples of suitable screw pumps for driving or feeding powders and/or pellets include those discussed in Bosveld et al., U.S. Publication No. 2013/0333798. In other embodiments, drive mechanism 62 may function as a displacement pump.

As shown in FIG. 15, multiple liquefier stages 44 and conduits 46 feed into a single accumulator stage 48. As such, accumulator stage 48 can be combined with one or more liquefier stages 44, allowing larger flow rates of the molten materials to be achieved. This embodiment also allows different types of consumable materials to be used with the same accumulator stage 48. Preferred numbers of liquefier stages 44 and conduits 46 per accumulator stage 48 range from one to six, more preferably from one to four, and in some embodiments from one to two.

The multiple-stage embodiments shown in FIGS. 13-15 illustrate how the upstream liquefier stage 42 can receive the consumable material in a variety of media forms, and with a variety of different drive mechanisms for feeding the consumables and generating pressures on the molten materials. As can also be appreciated from the above discussion, the coordinated operation of the drive mechanism 62 and the faster-responding actuator mechanism 94 allow controller assembly 34 to print roads of the molten part and support materials with accurate and consistent volumes while moving along a variety of different tool path trajectories that have non-steady-state conditions, such as road starts and stops, corners, and other conditions where the extrudate flow rates may vary.

In addition, the coordinated operation of positioners 40 and 42 allows print assembly 18 to produce 3D parts (e.g., 3D part 12) with good part resolutions and fast printing speeds, even when negotiating tortuous tool paths, such as tool paths with sinusoidal geometries, sharp corners, sharp 180-degree turns, and the like. Moreover, the combination of the two or more robotic positioners (e.g., positioners 40 and 42) and the one or more multiple-stage liquefier assemblies (e.g., liquefier assemblies 20) allows controller assembly 34 to print 3D parts and support structures with a combination of a coarse-fine position control and a coarse-fine extrusion control.

As mentioned above, one or more portions of print assembly 18, container portion 22, and guide tube 24 are sub-components of consumable assembly 16, such that the given portions of print assembly 18, container portion 22, and guide tube 24 are collectively replaced in an interchangeable manner, as discussed in Swanson, U.S. Pat. No. 8,403,658. For example, in a first embodiment, coarse positioner 42 can be a universal robotic positioner. In this case, liquefier assembly 20 (including liquefier stage 44, conduit 46, and accumulator stage 48) and fine positioner 42 may be removable and interchangeable components that can be secured to (e.g., with a snap-fit mechanism) effector 54. In some embodiments, liquefier assembly 20 and fine positioner 42 may also be sub-components of consumable assembly 16, along with container 22 and guide tube 24.

EXAMPLES

The present disclosure is more particularly described in the following examples that are intended as illustrations only, since numerous modifications and variations within the scope of the present disclosure will be apparent to those skilled in the art.

Figure 16:
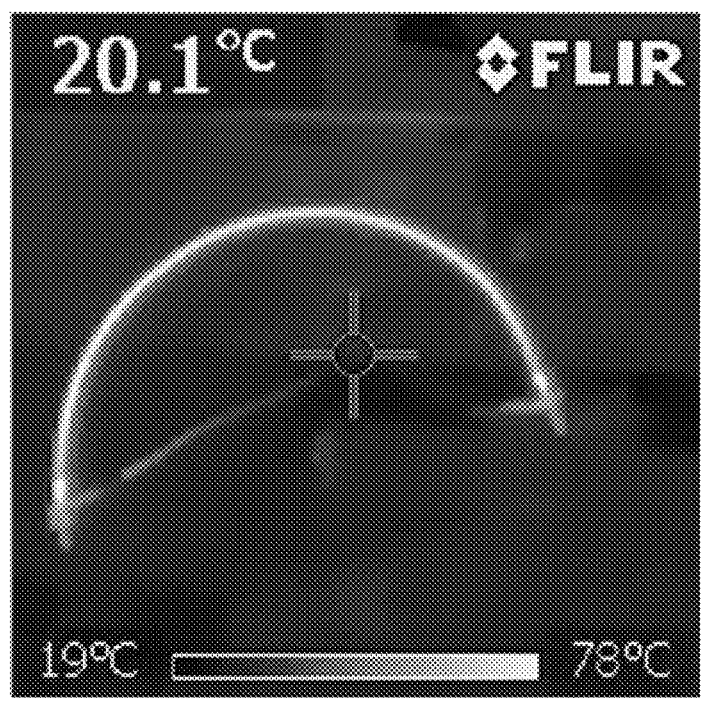
FIG. 16 is an infrared photograph of an example self-heating conduit test.

A test was performed to determine whether a conduit (e.g., corresponding to conduit 46) is capable of self heating under an applied electrical current. FIG. 16 is an infrared image of the test conduit being electrically heated. The conduit was a 14-gauge 304-stainless steel tubing, 12-inches long, with an 84 mil outer diameter, and 10 mil wall thickness. 12-gauge copper wires (3-feet in length) connected the conduit to a 10-ampere power supply, which required about 1.9 Volts of drive. The copper wires were brazed to the conduit with Muggy Weld SSF-6 silver solder using a propane torch. As shown in FIG. 16, pushing 10 amperes through the conduit raised the temperature of the conduit to about 90° C. in ambient air. This illustrates that the conduits, liquefiers, and accumulators of the present disclosure are capable of self heating under applied electrical currents.

Although the present disclosure has been described with reference to preferred embodiments, workers skilled in the art will recognize that changes may be made in form and detail without departing from the spirit and scope of the disclosure. Applicant hereby incorporates by reference U.S. Provisional Application Ser. No. 62/056,186 entitled LIQUEFIER ASSEMBLIES FOR ADDITIVE MANUFACTURING SYSTEMS, AND METHODS OF USE THEREOF filed on Sep. 26, 2014 in its entirety herein.

The invention claimed is:

1. A print assembly for use in an additive manufacturing system to print three-dimensional parts, the print assembly comprising:
    a first robotic positioner configured to move in a x-y plane;
    a second robotic positioner operably mounted to the first robotic positioner such that the first robotic positioner is configured to move the second robotic positioner, and wherein the second robotic positioner is configured to move in the x-y plane relative to the first robotic positioner but with a smaller range of motion, and wherein the second robotic positioner is smaller than and has a higher fundamental resonance frequency than the first robotic positioner; and
    a liquefier assembly configured to melt and extrude a consumable material that is deposited to form printed three-dimensional parts, wherein a portion of the liquefier assembly is operably mounted to the second robotic positioner, wherein the consumable material is extruded from the portion mounted to the second robotic positioner, and wherein a location of deposited consumable material is controlled by the second robotic positioner;
    wherein the second robotic positioner can accelerate and decelerate with rates of 30 gees or greater without inducing position errors in the location of deposited consumable material.

2. The print assembly of claim 1, wherein the portion of the liquefier assembly that is operably mounted to the second robotic positioner has a mass of less than 50 grams, and wherein the first positioner is limited to a one square inch range of motion in the x-y plane.

3. The print assembly of claim 2, wherein the mass of the portion of the liquefier assembly that is operably mounted to the second robotic positioner is less than 20 grams.

4. The print assembly of claim 1, wherein the portion of the liquefier assembly that is operably mounted to the second robotic positioner comprises:

an accumulator;

a nozzle at an outlet end of the accumulator; and an actuator mechanism configured to controllably apply pressure to transversely compress the accumulator.

5. The print assembly of claim 4, wherein the liquefier assembly further comprises:

a drive mechanism;

a liquefier configured to receive a consumable material from the drive mechanism; and one or more first heater assemblies configured to heat the liquefier for melting the received consumable material.

6. The print assembly of claim 5, wherein the liquefier assembly further comprises a conduit configured to receive the molten consumable material from the liquefier.

7. The print assembly of claim 6, wherein the conduit comprises a thermally and electrically conductive material.

8. The method of claim 1, wherein the second robotic positioner comprises one or more voice coil actuators configured to move the second robotic positioner within the x-y plane, and optionally out of plane along a z axis.

9. The print assembly of claim 4, wherein the accumulator has a hollow cross section selected from the group consisting of a rectangular geometry, an elliptical geometry, and an arcuate geometry.

10. The print assembly of claim 4, wherein the actuator mechanism comprises one or more piezoelectric actuators.

11. A print assembly for use in an additive manufacturing system to print three-dimensional parts, the print assembly comprising:

a coarse positioner configured to move in a plane;

a fine positioner operably mounted to the coarse positioner such that the coarse positioner is configured to move the fine positioner in the plane relative to the course positioner; and a liquefier assembly comprising a first stage and a second stage connected to the first stage, wherein the second stage is mounted to the fine positioner, and wherein the fine positioner is configured to move the second stage of the liquefier assembly relative to the coarse positioner, wherein consumable material is extruded from the second stage and a location of extended material is controlled by a location of the fine positioner.

12. The print assembly of claim 11, wherein the plane is the x-y plane.

13. The print assembly of claim 11, wherein the first stage of the liquefier assembly further comprises:

a drive mechanism;

a liquefier configured to receive a consumable material from the drive mechanism; and one or more first heater assemblies configured to heat the liquefier for melting the received consumable material.

14. The print assembly of claim 13, wherein the second stage of the liquefier assembly comprises:

an accumulator;

a nozzle at an outlet end of the accumulator; and an actuator mechanism configured to controllably apply pressure to transversely compress the accumulator.

15. The print assembly of claim 14, wherein the actuator mechanism comprises one or more piezoelectric actuators.

16. The print assembly of claim 11, wherein the liquefier assembly comprises a conduit connecting the first stage and the second stage.

17. The print assembly of claim 16, wherein the conduit comprises a thermally and electrically conductive material.

18. A method for printing a three-dimensional part with an additive manufacturing system, the method comprising:

moving a fine positioner in an x-y plane with a coarse positioner;

moving, with the fine positioner, a portion of a liquefier assembly in the x-y plane relative to the coarse positioner wherein the fine positioner can accelerate and decelerate with rates of 30 gees or greater without inducing position errors in the location of deposited consumable material; and melting and extruding a consumable material in the liquefier assembly to print the three-dimensional part in a layer-by-layer manner.

19. The method of claim 18, wherein the portion of the liquefier assembly moved with the fine positioner comprises:

an accumulator;

a nozzle at an outlet end of the accumulator; and an actuator mechanism; and wherein the method further comprises controllably apply pressure on the accumulator with the actuator mechanism to transversely compress the accumulator.

20. The method of claim 18, wherein the fine positioner has a higher fundamental resonance frequency than the coarse positioner.

* * * * *

UNITED STATES PATENT AND TRADEMARK OFFICE
CERTIFICATE OF CORRECTION

PATENT NO. : 10,744,753 B2  
APPLICATION NO. : 15/514740  
DATED : August 18, 2020  
INVENTOR(S) : J. Samuel Batchelder and William J. Swanson Page 1 of 1

It is certified that error appears in the above-identified patent and that said Letters Patent is hereby corrected as shown below:

In the Claims

Column 27, Claim 11, Line 42:  
Please delete "the second stage and a location of extended material is"  
And insert --the second stage and a location of extruded material is--

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*